(12) United States Patent
Cho et al.

(10) Patent No.: US 7,831,286 B2
(45) Date of Patent: Nov. 9, 2010

(54) SLIDING STRUCTURE FOR ELECTRONIC DEVICE

(75) Inventors: Se-hoon Cho, Gwangju-si (KR); Jong-soon Kim, Gimhae-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 549 days.

(21) Appl. No.: 12/004,348

(22) Filed: Dec. 20, 2007

(65) Prior Publication Data

US 2008/0151510 A1 Jun. 26, 2008

(30) Foreign Application Priority Data

Dec. 26, 2006 (KR) .................. 10-2006-0134118
Jan. 18, 2007 (KR) .................. 10-2007-0005618

(51) Int. Cl.
*H04M 1/00* (2006.01)
(52) U.S. Cl. ............ 455/575.4; 455/575.1; 455/90.3; 455/566; 455/347; 455/348; 379/433.01; 379/433.04; 379/433.07; 379/433.1; 379/433.11; 379/433.12
(58) Field of Classification Search ............ 455/575.1, 455/575.3, 575.4, 90.3, 566, 347–349; 379/433.01, 379/433.04, 433.07, 433.1, 433.11, 433.12, 379/433.13
See application file for complete search history.

(56) References Cited

U.S. PATENT DOCUMENTS

| | | | |
|---|---|---|---|
| 7,076,058 B2 * | 7/2006 | Ikeuchi et al. .......... | 379/433.12 |
| 7,107,018 B2 * | 9/2006 | Jellicoe .................... | 455/90.3 |
| 7,269,451 B2 * | 9/2007 | Kwon ..................... | 455/575.4 |
| 7,331,516 B2 * | 2/2008 | Hwang et al. ............. | 235/380 |
| 7,385,150 B1 * | 6/2008 | Siddiqui et al. ........... | 200/5 A |
| 7,496,389 B2 * | 2/2009 | Cho et al. ................ | 455/575.4 |
| 7,636,592 B2 * | 12/2009 | Kim et al. ................ | 455/575.4 |
| 2005/0070348 A1 * | 3/2005 | Lee et al. ................. | 455/575.4 |
| 2007/0004477 A1 * | 1/2007 | Kim ........................ | 455/575.4 |
| 2007/0037618 A1 * | 2/2007 | Lee ........................ | 455/575.4 |
| 2007/0105606 A1 * | 5/2007 | Yoon et al. ............... | 455/575.4 |
| 2007/0238494 A1 * | 10/2007 | Pan ........................ | 455/575.4 |

FOREIGN PATENT DOCUMENTS

| | | |
|---|---|---|
| KR | 1020050037649 A | 4/2005 |
| KR | 1020050089584 A | 9/2005 |

* cited by examiner

*Primary Examiner*—Tuan A Tran
(74) *Attorney, Agent, or Firm*—Drinker Biddle & Reath LLP

(57) ABSTRACT

A low friction and stable sliding structure for an electronic device that reduces the thickness of the electronic device. The sliding structure includes a first sliding member including at least one first guide portion, a second sliding member including a first receiving portion slidably receiving the first guide portion, and at least one second guide portion formed on a plane different from that on which the first receiving portion is formed, a third sliding member including a second receiving portion slidably receiving the second guide portion. The sliding structure further includes an arrangement of first, second, third and fourth magnet portions configured to enable the first and second sliding member to slide smoothly with respect to each other.

24 Claims, 16 Drawing Sheets

SLIDING STRUCTURE FOR ELECTRONIC DEVICE

CROSS-REFERENCE TO RELATED PATENT APPLICATIONS

This application claims the benefit of Korean Patent Application No. 10-2007-0005618, filed on Jan. 18, 2007, and Korean Patent Application No. 10-2006-0134118, filed on Dec. 26, 2006, in the Korean Intellectual Property Office, the disclosures of which are incorporated herein in its entirety by reference.

BACKGROUND OF THE INVENTION

1. Field of the Invention

The present invention relates to a sliding structure for an electronic device, and more particularly, to a low friction and stable sliding structure for an electronic device, such as a telephone, to enable the electronic device to have reduced thickness.

2. Description of the Related Art

As sliding structures have the advantages of simple handling and attractive design, they are largely used in portable electronic devices such as cellular phones, cameras, portable multimedia players (PMP), personal computer (PC) or the like. FIG. 1A is a schematic perspective view illustrating a conventional cellular phone 10, and FIG. 1B is a schematic side view illustrating the conventional cellular phone 10 of FIG. 1A and its sliding structure 40.

Referring to FIGS. 1A and 1B, the conventional cellular phone 10 having the sliding structure 40 further includes a receiver portion 20 including a displaying portion 2, and a transmitter portion 30 including an operation-key portion 3, such as number key buttons or the like. In order to use the conventional cellular phone 10, the receiver portion 20 is pushed up via the sliding structure 40.

Referring to FIG. 1B, the conventional sliding structure 40 is disclosed in Korean Patent Publication No. 10-2005-0037649 and includes a first sliding member 41 and a second sliding member 42 that slides along the first sliding member 41. The first sliding member 41 includes a first magnet 43 and the second sliding member 42 includes a pair of second magnets 44a and 44b, and thus a sliding operation is assisted by a magnetic force.

In the conventional sliding structure 40, friction between the first sliding member 41 and the second sliding member 42 impedes the sliding operation. In particular, friction between the first sliding member 41 and the second sliding member 42 increases during a sliding operation due to an attractive force between the first magnet 43 and the pair of second magnets 44a and 44b. Accordingly, a user may need to push the sliding structure 40 harder in order to operate the conventional cellular phone 10.

FIG. 1C is a cross-sectional view illustrating another conventional sliding structure 50. Referring to FIG. 1C, the sliding structure 50, disclosed in Korean Patent Publication No. 10-2005-0089584, includes a first sliding member 51 and a second sliding member 52 sliding on the first sliding member 51.

The first sliding member 51 includes a first magnet 53 having a horseshoe shape, and the second sliding member 52 includes a second magnet 54 also having a horseshoe shape. The first magnet 53 and the second magnet 54 are alternately arranged to facilitate a sliding operation.

In the sliding structure 50, repulsive forces act between the N pole of the first magnet 53 and the N pole of the second magnet 54, and between the S pole of the first magnet 53 and the S pole of the second magnet 54 when a sliding operation is being performed. Simultaneously, an attractive force also acts between the S pole of the first magnet 53 and the N pole of the second magnet 54. Accordingly, the sliding operation does not proceed smoothly since a user may need to push the sliding structure 50 harder due to the attractive force between the first magnet 53 and the second magnet 54.

In addition, in the sliding structure 50, since the first magnet 53 and the second magnet 54, which have horseshoe shapes, are alternately arranged, a large space for such an arrangement is required, and thus the thickness of the sliding structure 50 is increased. Also, in curved parts where parts of the first magnetic member 53 and the second magnetic member 54 do not overlap, since a repulsive force between the parts of the first magnetic member 53 and the second magnetic member 54 is reduced, the sliding operation cannot be easily performed.

Another example of a conventional sliding structure is a sliding structure that can slide in four directions. The sliding structure includes a first sliding member and a second sliding member, which can slide in a vertical direction, and a third sliding member and a fourth sliding member, which can slide in a horizontal direction. However, in such a conventional four-directional sliding structure, since two magnetic levitation modules are disposed perpendicular or substantially perpendicular to each other, the thickness of the sliding structure is increased.

Generally, in the conventional four-directional sliding structure, an extension key pad is formed in a vertical direction on the second sliding member that slides in a vertical direction, and a number key pad is formed in a horizontal direction on the third sliding member that slides in a horizontal direction. In this arrangement, since the readable display directions, which are directions in which a user can read key pads without having to rotate a structure, of the extension key pad and the number key pad are perpendicular or substantially perpendicular to each other, a user has to read the number key pad in a perpendicular or substantially perpendicular direction to the extension key pad when both the number key pad and the extension key pad are being used.

SUMMARY OF THE INVENTION

The present invention provides a low friction and stable sliding structure for an electronic device, by which a thin electronic device can be realized. The present invention also provides a sliding structure for an electronic device which improves convenience for a user and allows the user to easily read a key pad.

An embodiment of the present invention therefore provides a sliding structure for an electronic device. The sliding structure includes a first sliding member comprising at least one first guide portion, a second sliding member comprising a first receiving portion receiving the first guide portion so that the first sliding member slides, and at least one second guide portion formed on a plane that is not the same plane on which the first receiving portion is formed, and a third sliding member comprising a second receiving portion receiving the second guide portion so that the second sliding member slides. The sliding structure further includes a first magnet portion disposed in the first guide portion, and a pair of second magnet portions disposed in the first receiving portion so as to face each other, such that the first guide portion is disposed between the second magnet portions, and a repulsive force acts between each of the second magnet portions, and the first magnet portion. Additionally, the sliding structure includes a third magnet portion disposed in the second guide portion, and a pair of fourth magnet portions disposed in the second receiving portion so as to face each other, such that the second guide portion is disposed between the fourth magnet portions and the second guide portion, and a repulsive force acts between each of the fourth magnet portions and the third magnet portion.

The first guide portion and the second guide portion may be formed substantially perpendicular to each other. At least one of the second magnet portions disposed in the first receiving portion may be disposed on substantially the same plane on which at least one of the fourth magnet portions disposed in the second receiving portion is disposed. Magnetic poles of the first magnet portion and the second magnet portions may be arranged perpendicular or substantially perpendicular to a sliding direction in which the second sliding member slides along the first sliding member. Magnetic poles of the third magnet portion and the fourth magnet portions may be arranged perpendicular or substantially perpendicular to a sliding direction in which the third sliding member slides along the second sliding member.

Also, at least one of the magnetic poles of the pair of second magnet portions and the magnetic poles of the pair of fourth magnet portions may be arranged so as to be the same as each other. The magnetic poles of the second magnet portions may be arranged in a direction in which the magnetic poles of the fourth magnet portions are arranged. The lengths of the second magnet portions may be different from each other so that a sliding length is extended, by which the second sliding member slides along the first sliding member.

Furthermore, one of the fourth magnet portions has magnetic poles arranged in a direction in which the magnetic poles of the second magnet portion are arranged, and is formed on a side of one of the second magnet portions, which is shorter than the other of the second magnet portions. A sliding operation of the second sliding member with respect to the first sliding member may be guided by a repulsive force acting between the first magnet portion and each of the second magnet portions, and by a repulsive force acting between the first magnet portion and each of the fourth magnet portions.

According embodiment of the present invention provides a sliding structure for an electronic device. The sliding structure includes a first sliding member comprising at least one first guide portion, a second sliding member comprising a first receiving portion receiving the first guide portion, and at least one second guide portion formed on a part that is not a surface on which the first receiving portion is formed, and a third sliding member comprising a second receiving portion receiving the second guide portion. The sliding structure further includes a first key pad portion formed on the second sliding member, and a second key pad portion formed on the third sliding member, such that at least one of the first key pad and the second key pad is formed so that a display form thereof is changeable.

A readable display direction of at least one of the first key pad portion and the second key pad portion may be changeable. Also, the arrangement of at least one of the first key pad portion and the second key pad portion may be changeable. Furthermore, readable display directions of the first key pad portion and the second key pad portion may be the same when the first key pad portion and the second key pad portion are both exposed.

The sliding structure may further include a sensor or a switcher, which detects an open/close state of at least one of the first sliding member, the second sliding member and the third sliding member, and is formed on at least one of the first sliding member, the second sliding member and the third sliding member. The sliding structure may further include a user interface member by which a readable display direction of at least one of the first key pad and the second key pad is changed.

A readable display direction of the second key pad may be parallel or substantially parallel to the second receiving portion when only the third sliding member is exposed. Also, a readable display direction of the second key pad may be substantially perpendicular to the second receiving portion when the first sliding member and the third sliding member are both exposed. Furthermore, an arrangement of the second key pad may be constant both when a readable display direction of the second key pad portion is substantially perpendicular to the second receiving portion, and when the readable display direction of the second key pad portion is parallel or substantially parallel to the second receiving portion.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, exemplary embodiments of the present invention will be described with reference to the attached drawings.

Figure 1A:
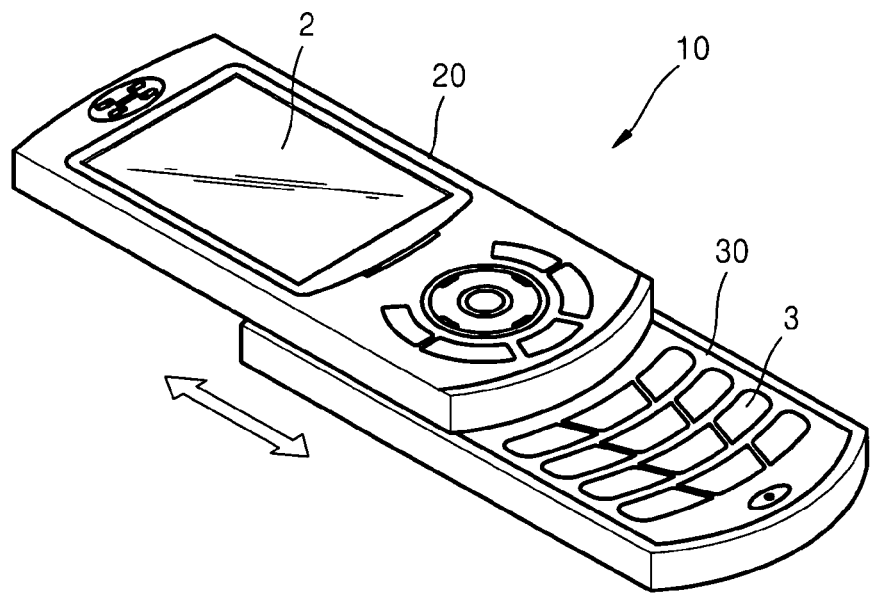
FIG. 1A is a schematic perspective view illustrating a conventional cellular phone having a sliding structure.
Figure 1B:
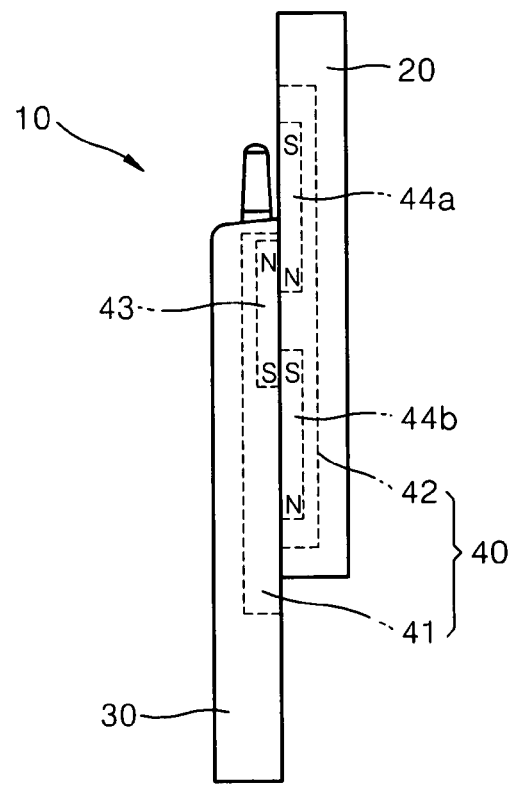
FIG. 1B is a schematic side view illustrating the conventional cellular phone of FIG. 1A.
Figure 1C:
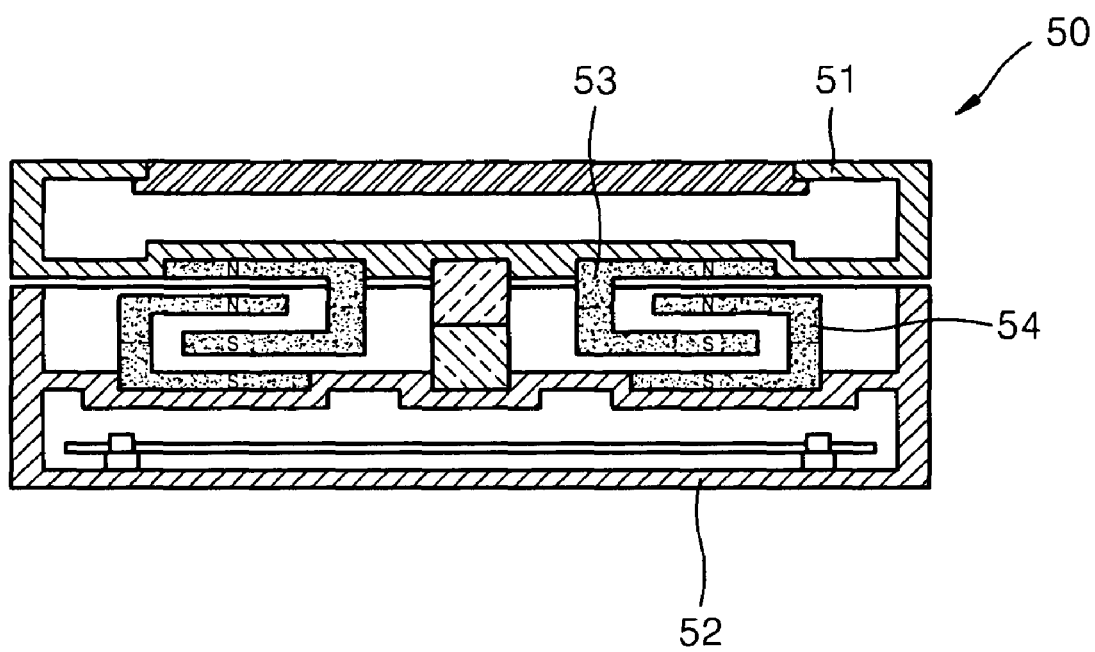
FIG. 1C is a cross-sectional view illustrating another conventional sliding structure.
Figure 2:
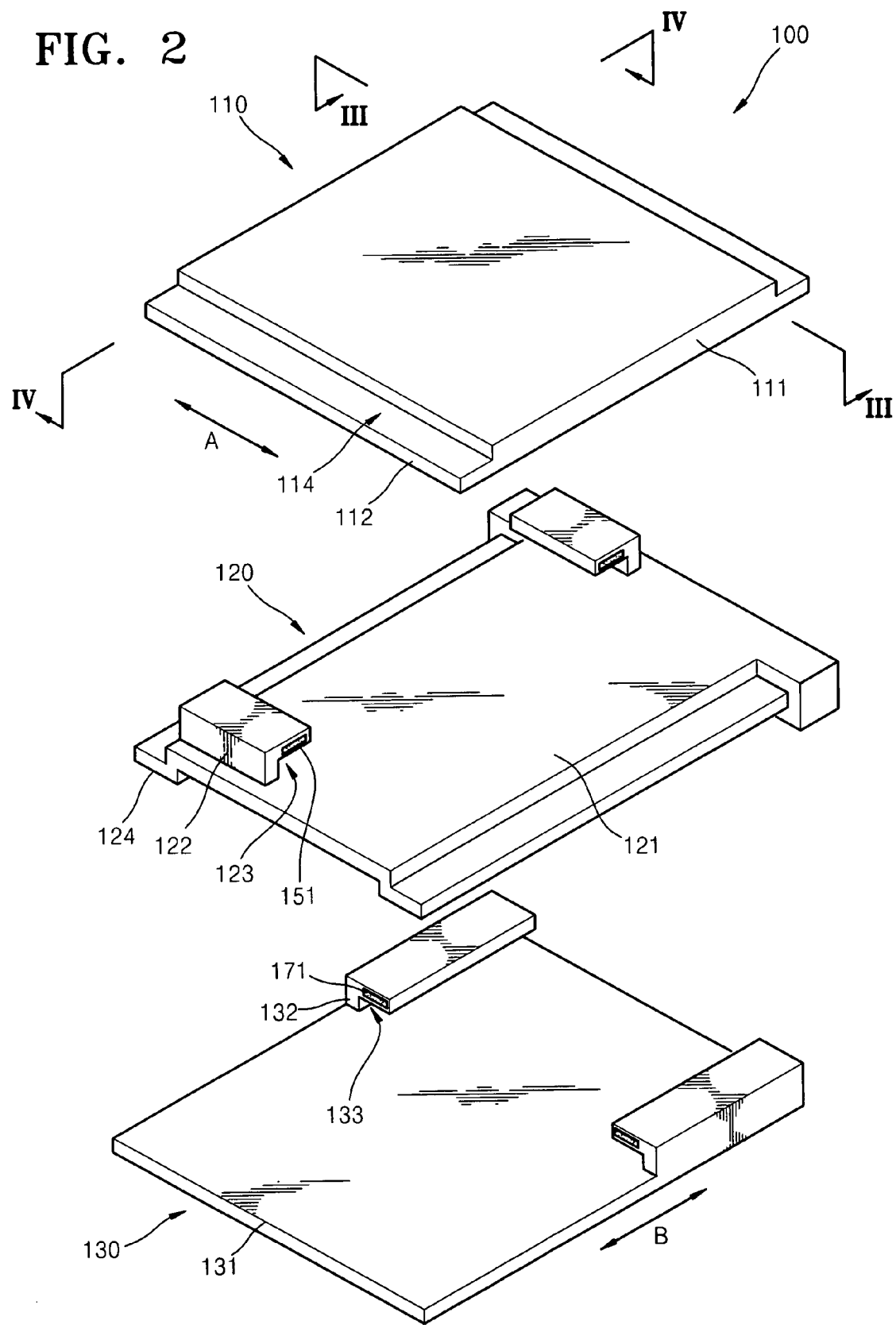
FIG. 2 is a perspective view illustrating an example of a sliding structure, according to an embodiment of the present invention.
Figure 3:
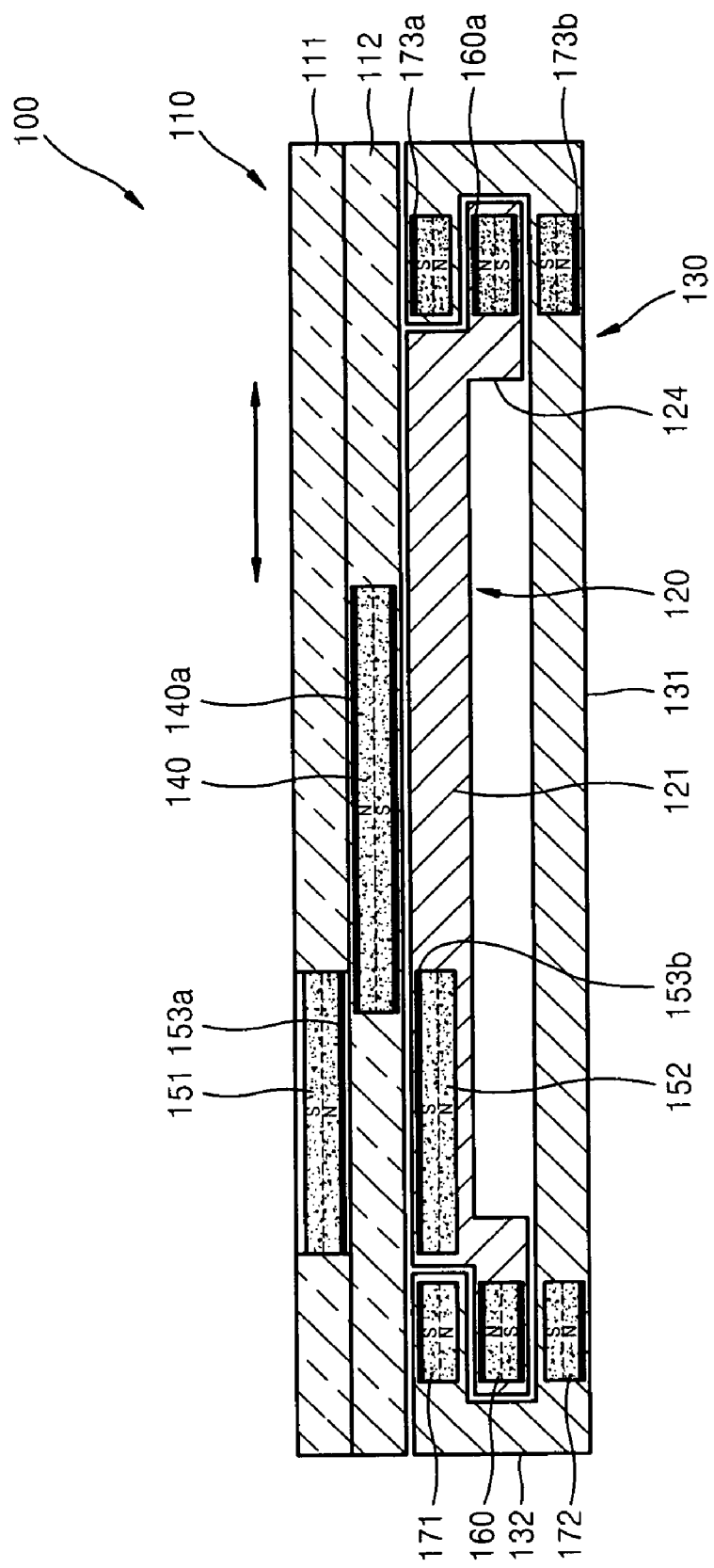
FIG. 3 is a cross-sectional view of the sliding structure taken along a line III-III of FIG. 2.
Figure 4:
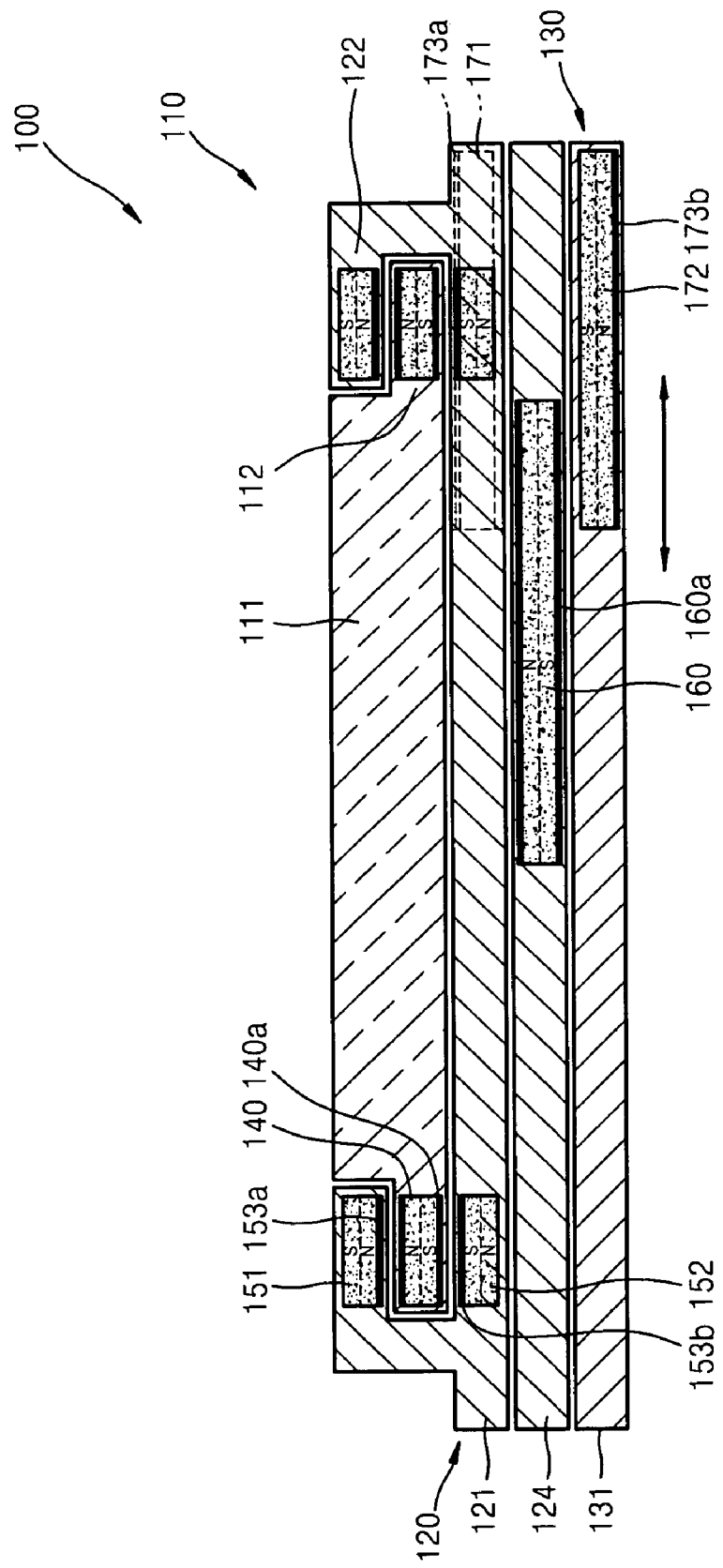
FIG. 4 is a cross-sectional view of the sliding structure taken along a line IV-IV of FIG. 2.

FIG. 2 is a perspective view of an example of a sliding structure 100, according to an embodiment of the present invention. FIG. 3 is a cross-sectional view of the sliding structure 100 taken along a line III-III of FIG. 2. FIG. 4 is a cross-sectional view of the sliding structure 100 taken along a line IV-IV of FIG. 2.

Referring to FIGS. 2 and 3, the sliding structure 100 includes a first sliding member 110, a second sliding member 120, a third sliding member 130, a first magnet portion 140, a pair of second magnet portions 151 and 152, a third magnet portion 160 and a pair of fourth magnet portions 171 and 172. The first sliding member 110 is formed of a non-magnetic material such as an aluminum alloy, and includes a first support portion 111 and a first guide portion 112. The first support portion 111 has a flat or substantially flat shape. The first guide portion 112 extends from two sides of a lower part of the first support portion 111.

The first support portion 111 and the first guide portion 112 in this example may be manufactured by using various methods such as a die casting method or a method in which a flat or substantially flat material is bent and plastic-deformed, but the present invention is not limited to these methods and any suitable method can be used.

The second sliding member 120 is formed of a non-magnetic material such as an aluminum alloy and includes a second support portion 121, a first receiving portion 122 and a second guide portion 124. The second support portion 121 has a flat or substantially flat shape. The first receiving portion 122 is disposed on an upper surface of two sides of the second support portion 121.

The first receiving portion 122 has a ⌐⌐ shape or a substantially similar shape, and a first receiving groove 123 is disposed in the first receiving portion 122. Since the first guide portion 112 is inserted into the first receiving groove 123 when the sliding structure 100 is assembled, the first guide portion 112 functions as a sliding guider.

The second guide portion 124 extends from two sides of a lower part of the second support portion 121 in a direction perpendicular or substantially perpendicular to a direction in which the first receiving portion 122 is formed. In particular, the sliding structure 100 includes the first sliding member 110, the second sliding member 120 and the third sliding member 130, such that the first sliding member 110 and the third sliding member 130 slide along the second sliding member 120 in directions perpendicular or substantially perpendicular to each other.

To achieve this, the first guide portion 112 and the first receiving portion 122 are respectively formed in the first sliding member 110 and the second sliding member 120 so that the first sliding member 110 may slide along the second sliding member 120 in one direction. The second guide portion 124 and a second receiving portion 132 are respectively formed on the second sliding member 120 and the third sliding member 130 so that the third sliding member 130 may slide along the second sliding member 120 in a direction perpendicular or substantially perpendicular to a sliding direction in which the first sliding member 110 slides along the second sliding member 120.

That is, as illustrated in FIG. 2, the first sliding member 110 is configured so as to slide along the second sliding member 120 in a direction A. In addition, the third sliding member 130 is configured so as to slide along the second sliding member 120 in a direction B.

The second support portion 121, the first receiving portion 122 and the second guide portion 124 in this example may be manufactured by using various methods such as a die casting method or a method in which a flat or substantially flat material is bent and plastic-deformed, but the present invention is not limited to these methods and any suitable method can be used.

The third sliding member 130 is formed of a non-magnetic material such as an aluminum alloy, and includes a third support portion 131 and the second receiving portion 132. The first sliding member 110, the second sliding member 120 and the third sliding member 130 in this example are formed of an aluminum alloy, but the present invention is not limited to this material and any suitable material can be used. For example, the first sliding member 110, the second sliding member 120 and the third sliding member 130 may be formed of a plastic resin, or may be formed of different materials.

The third support portion 131 has a flat or substantially flat shape, and the second receiving portion 132 is disposed on an upper surface of two sides of the third support portion 131. The second receiving portion 132 has a ⌐⌐ shape or substantially similar shape, and a second receiving groove 133 is disposed in the second receiving portion 132. Since the second guide portion 124 is inserted into the second receiving groove 133 when the sliding structure 100 is assembled, the second guide portion 124 functions as a sliding guider. A lubricant, such as a ceramic material, may be coated on a surface of the first guide portion 112, an inner surface of the first receiving portion 122, a surface of the second guide portion 124, an inner surface of the second receiving portion 132 or the like, in order to further decrease friction during a sliding operation.

The first magnet portion 140 is embedded in the first guide portion 112. The first magnet portion 140 in this example is a permanent magnet, but the present invention is not limited thereto. That is, the first magnet portion 140 may be an electromagnet, or the like.

The first magnet portion 140 is embedded in the first guide portion 112, but the present invention is not limited to this arrangement. That is, the first magnet portion 140 may be mounted on the first guide portion 112 or secured in any other suitable manner.

The first magnet portion 140 is mounted on a middle part of a sliding stroke of the first guide portion 112 as illustrated in FIG. 2, in order to facilitate a sliding operation. The first magnet portion 140 has a square or substantially square shape, and the magnetic poles of the first magnet portion 140 are arranged so as to be perpendicular or substantially perpendicular to the sliding direction.

Furthermore, the first magnet portion 140 is arranged so that the N pole and the S pole respectively correspond to an upper part and a lower part of the first magnet portion 140.

Although the first magnet portion 140 in this example is arranged so that the N pole and the S pole respectively correspond to the upper part and the lower part thereof, the present invention is not limited to this arrangement. That is, according to an embodiment of the present invention, the first magnet portion 140 may be arranged so that the S pole and the N pole respectively correspond to the upper part and the lower part thereof. In such a case, the second magnet portions 151 and 152 corresponding to the first magnet portion 140 may be arranged so that the magnetic poles thereof properly match the magnetic poles of the first magnet portion 140.

A magnetic shield 140*a* is mounted on the upper and lower parts of the first magnet portion 140. The magnetic shield 140*a* in this example is mounted on upper and lower surfaces of the first magnet portion 140, but the present invention is not limited to this arrangement. That is, the magnetic shield 140*a* may be further mounted on a side surface of the first magnet portion 140. In addition, the magnetic shield 140*a* may be mounted on a part of the first guide portion 112 in which the first magnet portion 140 is mounted, instead of on a surface of the first magnet portion 140. In such a case, the magnetic shield 140*a* is placed on an appropriate part of the first guide portion 112, and then the first magnet portion 140 may be mounted on the first guide portion 112.

The magnetic shield 140*a* is formed of a ferromagnetic substance, such as an AD-MU alloy or the like, and shields the magnetic lines of force generated by the first magnet portion 140. The magnetic shield 140*a* in this example is formed of a ferromagnetic substance, but the present invention is not limited to this material. That is, according to an embodiment of the present invention, the magnetic shield 140*a* may be formed of a non-magnetic material or any other suitable material. The second magnet portions 151 and 152 are embedded in the first receiving portion 122. The second magnet portions 151 and 152 in this example may each be a permanent magnet, but the present invention is not limited to this arrangement. That is, according to an embodiment of the present invention, the second magnet portions 151 and 152 may each be an electromagnet, or the like.

The second magnet portions 151 and 152 are embedded in the first receiving portion 122, but the present invention is not limited to this arrangement. That is, according to the present invention, the second magnet portions 151 and 152 may be mounted on a surface of the first receiving portion 122.

Each of the second magnet portions 151 and 152 has a square or substantially square shape. The second magnet portions 151 and 152 are arranged on an upper part and a lower part of the second receiving portion 132, respectively. At this time, the first magnet portion 140 is disposed between the second magnet portions 151 and 152, and thus the second magnet portions 151 and 152 operate in conjunction with the first magnet portion 140.

The second magnet portions 151 and 152 are arranged so that the magnetic poles thereof may be arranged in a direction perpendicular or substantially perpendicular to a sliding direction, and the arrangement of the magnetic poles of the second magnet portions 151 and 152 may be the same. That is, each of the second magnet portions 151 and 152 is arranged so that the S pole and the N pole respectively correspond to an upper part and a lower part of each second magnet portion 151 and 152, as illustrated in FIG. 4.

The magnetic poles of the second magnet portions 151 and 152 are arranged in a direction opposite to that of the magnetic poles of the first magnet portion 140. Thus, since a repulsive force acts between each of the second magnet portions 151 and 152, and the first magnet portion 140, a stable sliding operation can be realized.

The first magnet portion 140, and the second magnet portions 151 and 152 are arranged so that a perpendicular or substantially perpendicular imaginary line, which connects surfaces of the second magnet portions 151 and 152, which face each other, passes at least a part of the first magnet portion 140 throughout the entire sliding operation. As a result of this structure, a repulsive force always acts between the first magnet portion 140 and each of the second magnet portions 151 and 152. Accordingly, friction is minimized when the second sliding member 120 including the second magnet portions 151 and 152 slides along the first sliding member 110 including the first magnet portion 140 since the second sliding member 120 is lifted from a surface of the first sliding member 110 due to a repulsive force. In such a case, the degree of lifting is proportional to the repulsive magnetic force, and more particularly, to the size and property of the magnet used.

In this exemplary embodiment, the first magnet portion 140, and the second magnet portions 151 and 152 are arranged so that the perpendicular or substantially perpendicular imaginary line, which connects the surfaces of the second magnet portions 151 and 152, which face each other, passes at least a part of the first magnet portion 140 throughout the entire sliding operation, but the present invention is not limited to this arrangement. That is, according to an embodiment of the present invention, the perpendicular or substantially perpendicular imaginary line may not pass through the first magnet portion 140. However, in such a case, the first magnet portion 140, and each of the second magnet portions 151 and 152 are arranged at a smaller distance from each other than in the previous case, so that a repulsive force generated between the first magnet portion 140, and each of the second magnet portions 151 and 152 may increase in order to decrease sliding friction.

Magnetic shields 153*a* and 153*b* are respectively arranged on a lower surface of a second magnet portion 151 and an upper surface of the second magnet portion 152. Since the materials and functions of the magnetic shields 153*a* and 153*b* can be the same as those of the magnetic shield 140*a*, a detailed description of the magnetic shields 153*a* and 153*b* will be omitted here.

The magnetic shields 153*a* and 153*b* in this example are respectively arranged only on the lower surface of the second magnet portion 151 and the upper surface of the second magnet portion 152, but the present invention is not limited to this arrangement. That is, the magnetic shields 153*a* and 153*b* may be further disposed on an upper surface of the second magnet portion 151, a lower surface of the second magnet portion 152, and on side surfaces of the second magnet portions 151 and 152. In addition, the magnetic shields 153*a* and 153*b* may be disposed in a part of the first receiving portion 122 in which the second magnet portions 151 and 152 are received, instead of on surfaces of the second magnet portions 151 and 152. In such a case, the magnetic shields 153*a* and 153*b* are disposed in an appropriate part of the first receiving portion 122, and then the second magnet portions 151 and 152 are disposed in the first receiving portion 122.

The third magnet portion 160 is embedded in the second guide portion 124. The third magnet portion 160 in this example can be a permanent magnet, but the present invention is not limited to this type of magnet. That is, the third magnet portion 160 may be an electromagnet, or the like.

The third magnet portion 160 is embedded in the second guide portion 124, but the present invention is not limited to this arrangement. That is, according to an embodiment the present invention, the third magnet portion 160 may be mounted on the second guide portion 124.

The third magnet portion 160 is mounted on a middle part of the sliding stroke of the second guide portion 124 as illustrated in FIG. 2, in order to facilitate the sliding operation. The third magnet portion 160 has a square or substantially square shape, and magnetic poles of the third magnet portion 160 are arranged so as to be perpendicular or substantially perpendicular to the sliding direction. Furthermore, the third magnet portion 160 is arranged so that the N pole and the S pole respectively correspond to an upper part and a lower part thereof.

Although the third magnet portion 160 in this example is disposed so that the N pole and the S pole respectively correspond to the upper part and the lower part thereof, the present invention is not limited to this arrangement. That is, according to an embodiment of the present invention, the third magnet portion 160 may be arranged so that the S pole and the N pole respectively correspond to the upper part and the lower part thereof. In such a case, the fourth magnet portions 171 and 172 corresponding to the third magnet portion 160 may be arranged so that the magnetic poles thereof properly match the magnetic poles of the third magnet portion 160.

A magnetic shield 160a is mounted on an upper surface and a lower surface of the third magnet portion 160. Since the material and function of the magnetic shield 160a are the same as those of the magnetic shield 140a, a detailed description of the magnetic shield 160a will be omitted here.

The fourth magnet portions 171 and 172 are embedded in the second receiving portion 132. The fourth magnet portions 171 and 172 may each be a permanent magnet, but the present invention is not limited to this type of magnet. That is, according to the present invention, the fourth magnet portions 171 and 172 may each be an electromagnet, or the like.

The fourth magnet portions 171 and 172 in this example are embedded in the second receiving portion 132, but the present invention is not limited to this arrangement. That is, according to an example of the present invention, the fourth magnet portions 171 and 172 may be mounted on a surface of the second receiving portion 132.

Each of the fourth magnet portions 171 and 172 has a square or substantially square shape. The fourth magnet portions 171 and 172 are respectively arranged on an upper part and a lower part of the second receiving portion 132. At this time, the third magnet portion 160 is disposed between the fourth magnet portions 171 and 172, and thus the fourth magnet portions 171 and 172 operate in conjunction with the third magnet portion 160.

The fourth magnet portions 171 and 172 are arranged so that the magnetic poles thereof may be arranged in a direction perpendicular or substantially perpendicular to the sliding direction, and arrangement of the magnetic poles of the fourth 171 and 172 may be the same. That is, each of the fourth magnet portions 171 and 172 is arranged so that the S pole and the N pole respectively correspond to an upper part and a lower part of each fourth magnet portion 171 and 172, as illustrated in FIG. 4.

The magnetic poles of the fourth magnet portions 171 and 172 are arranged in an order opposite to that of the magnetic poles of the third magnet portion 160. Thus, since a repulsive force acts between each of the fourth magnet portions 171 and 172, and the third magnet portion 160, a stable sliding operation can be realized. The third magnet portion 160, and the fourth magnet portions 171 and 172 are arranged so that a perpendicular or substantially perpendicular imaginary line, which connects surfaces of the fourth magnet portions 171 and 172, which face each other, passes at least a part of the third magnet portion 160 throughout the entire sliding operation. As a result of this structure, a repulsive force always acts between the third magnet portion 160 and each of the fourth magnet portions 171 and 172. Accordingly, friction is minimized when the third sliding member 130 including the fourth magnet portions 171 and 172 slides along the second sliding member 120 including the third magnet portion 160 since the third sliding member 130 is lifted from a surface of the second sliding member 120 due to the repulsive force. In such a case, the degree of lifting is proportional to the repulsive magnetic force, and more particularly, to the size and property of the magnet used.

In this embodiment, the third magnet portion 160, and the fourth magnet portions 171 and 172 are arranged so that the perpendicular or substantially perpendicular imaginary line, which connects the surfaces of the fourth magnet portions 171 and 172, which face each other, passes at least a part of the third magnet portion 160 throughout the entire sliding operation, but the present invention is not limited to this arrangement. That is, the perpendicular or substantially perpendicular imaginary line may not pass through the third magnet portion 160. However, in such a case, the third magnet portion 160, and the fourth magnet portions 171 and 172 are arranged at a smaller distance from each other than in the previous case, so that a repulsive force generated between the third magnet portion 160 and each of fourth magnet portions 171 and 172 increases in order to decrease sliding friction.

Magnetic shields 173a and 173b are disposed on a lower surface of a fourth magnet portion 171 and an upper surface of a fourth magnet portion 172, respectively. Since the material and function of the magnetic shields 173a and 173b are the same as those of magnetic shields 153a and 153b, a detailed description of the magnetic shields 173a and 173b will be omitted here.

In the sliding structure 100, one of the first sliding member 110, the second sliding member 120 and the third sliding member 130 is embedded in a primary body in which a main chip set of an electronic device such as a cellular phone, a camera, a portable multimedia player (PMP), personal computer (PC) or the like, and an electrical portion such as a battery are integrated, and the other members of the first sliding member 110, the second sliding member 120 and the third sliding member 130 are embedded in a secondary body having a relatively simple structure. Accordingly, the sliding operation of the sliding structure 100 is performed.

That is, as illustrated in FIG. 2, the first sliding member 110 is mounted on the primary body, the second sliding member 120 is mounted on a circuit board, and the third sliding member 130 is mounted on the secondary body on which a button portion is formed. In addition, one of the first sliding member 110, the second sliding member 120 and the third sliding member 130 may be integrally formed with the primary body, and the other members of the first sliding member 110, the second sliding member 120 and the third sliding member 130 may be integrally formed with the secondary body. In such a case, the volume of the sliding structure 100 can be reduced, and thus a thin electronic device, which can smoothly perform a sliding operation, can be realized.

The sliding structure 100 includes the first sliding member 110 and the second sliding member 120, which respectively include the first guide portion 112 and the first receiving portion 122 in order to slide in one direction, and the second sliding member 120 and the third sliding member 130, which respectively include the second guide portion 124 and the second receiving portion 132 in order to slide in a direction perpendicular or substantially perpendicular to the direction in which the first sliding member 110 slides along the second sliding member 120. That is, as illustrated in FIG. 2, the first sliding member 110, the second sliding member 120 and the third sliding member 130 are configured so that the first sliding member 110 may slide along the second sliding member 120 in the direction A, and simultaneously the third sliding member 130 may slide along the second sliding member 120 in the direction B.

Accordingly, since the sliding structure 100 is extendable in horizontal and vertical directions of an electronic device including the sliding structure 100, the electronic device can have an increased usable space, and can have various extension key pads mounted thereon. Since a portion of the sliding structure 100, which slides in the direction A, and a portion of the sliding structure 200, which slides in the direction B, partially overlap each other, the thickness of the sliding structure 100 can be reduced.

Hereinafter, operations of the sliding structure 100 will be described with reference to the above internal structure of the sliding structure 100. First, the operations of the first sliding member 110 and the second sliding member 120 will be described.

Figure 5:
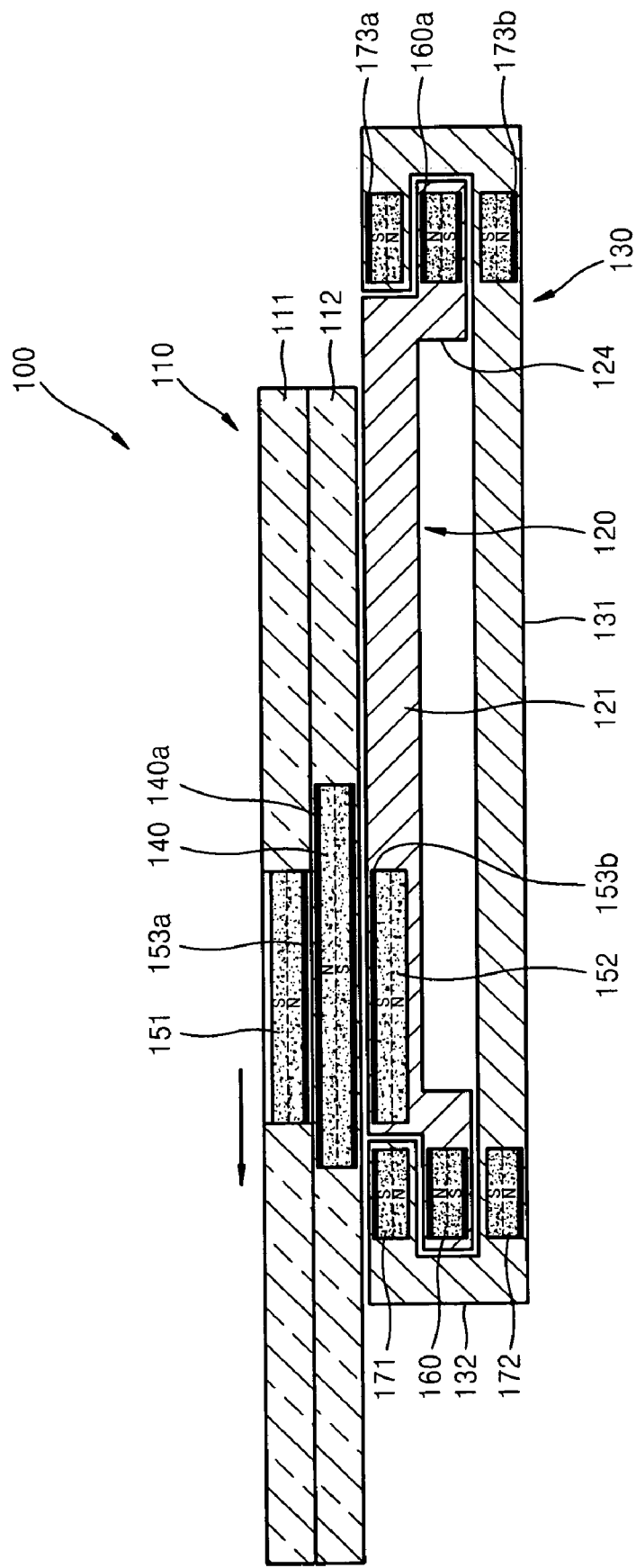
FIG. 5 is a cross-sectional view illustrating the sliding structure of FIG. 2 in the case where a first sliding member is at an intermediate position, according to an embodiment of the present invention.
Figure 6:
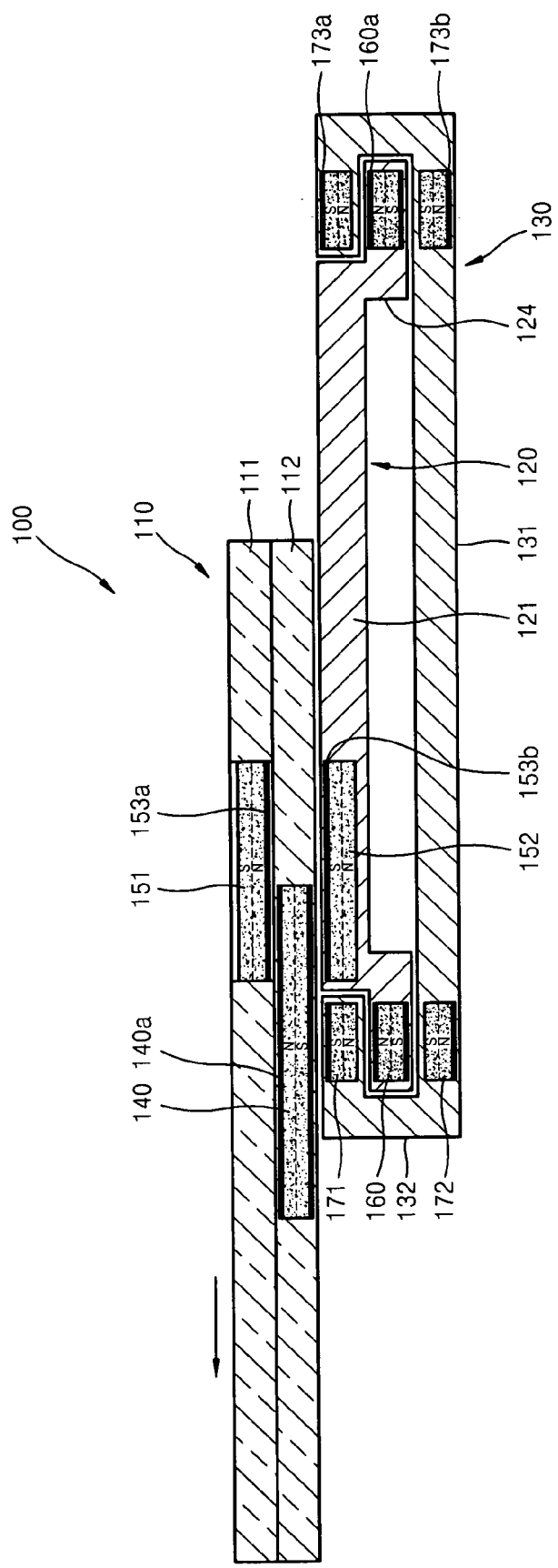
FIG. 6 is a cross-sectional view illustrating the sliding structure of FIG. 2 in the case where the first sliding member is at an end position, according to an embodiment of the present invention.

FIG. 3 is a cross-sectional view illustrating the first sliding member 110 illustrated in FIG. 2 in the case where the sliding structure 100 is at a start position, according to an embodiment of the present invention. FIG. 5 is a cross-sectional view illustrating the sliding structure 100 illustrated in FIG. 2 in the case where the first sliding member 110 is at an intermediate position, according to an embodiment of the present invention. FIG. 6 is a cross-sectional view illustrating the first sliding member 110 illustrated in FIG. 2 in the case where the first sliding member 110 is at an end position, according to an embodiment of the present invention.

In FIG. 3, the first sliding member 110 is at the start position. The first sliding member 110 is disposed on an upper part of the second sliding member 120.

As illustrated in FIG. 3, a part of the first magnet portion 140 is disposed between the second magnet portions 151 and 152, as illustrated in FIG. 3. In such a case, a repulsive force acts between each of the second magnet portions 151 and 152, and the first magnet portion 140 due to the arrangement of the magnetic poles of the second magnet portions 151 and 152, and the first magnet portion 140.

Accordingly, the first sliding member 110 can be stably disposed at the start position due to the repulsive force. Since the first sliding member 110 is lifted from a surface of the second sliding member 120 due to the repulsive force, sliding friction can be reduced.

When a user pushes up the first sliding member 110 at the position illustrated in FIG. 3, an entire part of the first magnet portion 140 is smoothly disposed between the second magnet portions 151 and 152. Then, a repulsive force is gradually increased between each of the second magnet portions 151 and 152, and the first magnet portion 140.

In such a case, although the user pushes up the first sliding member 110 at a rapid speed, the repulsive force generated between each of the second magnet portions 151 and 152, and the first magnet portion 140 prevents the first sliding member 110 from moving suddenly. Accordingly, an impact on the sliding structure 100 can be prevented. In addition, since the first sliding member 110 is lifted from a surface of the second sliding member 120 due to the repulsive force, sliding friction can be reduced.

When the user continues to push up the first sliding member 110, the sliding structure 100 reaches the position illustrated in FIG. 5. As show inn FIG. 5, the first sliding member 110 is at the intermediate position. As further illustrated in FIG. 5, since most of the first magnet portion 140 is disposed between the second magnet portions 151 and 152, a strong repulsive force acts between each of the second magnet portions 151 and 152, and the first magnet portion 140.

When the user continues to push up the first sliding member 110 in the position illustrated in FIG. 5, although the pushing force is not strong, the first sliding member 110 can be pushed up due to the repulsive force generated between each of the second magnet portions 151 and 152, and the first magnet portion 140.

In such a case, an excessive impact of the sliding structure 100 can be prevented since it is not necessary to apply a force to push up the first sliding member 110. In addition, since the first sliding member 110 is lifted from the surface of the second sliding member 120 due to the repulsive force, sliding friction can be reduced.

When the user continues to push up the first sliding member 110, the sliding structure 100 reaches the position illustrated in FIG. 6. As shown in FIG. 6, a repulsive force acts between each of the second magnet portions 151 and 152, and the first magnet portion 140 due to the arrangement of the magnetic poles of the second magnet portions 151 and 152, and the first magnet portion 140.

Accordingly, the first sliding member 110 can be stably disposed at the end position due to the repulsive force. Since the first sliding member 110 is lifted from a surface of the second sliding member 120 due to the repulsive force, when the user again pushes the first sliding member 110 downwards, sliding friction can be reduced.

In this example of the present invention, the case where the first sliding member 110 is pushed up has been described, but the present invention is not limited to this arrangement. That is, according to an example of the present invention, when the first sliding member 110 at the end position illustrated in FIG. 6 is pushed downwards, the sliding operation of the sliding structure 100 is performed in the same way except for the sliding direction.

Next, sliding operations of the third sliding member 130 and the second sliding member 120 will be described.

Figure 7:
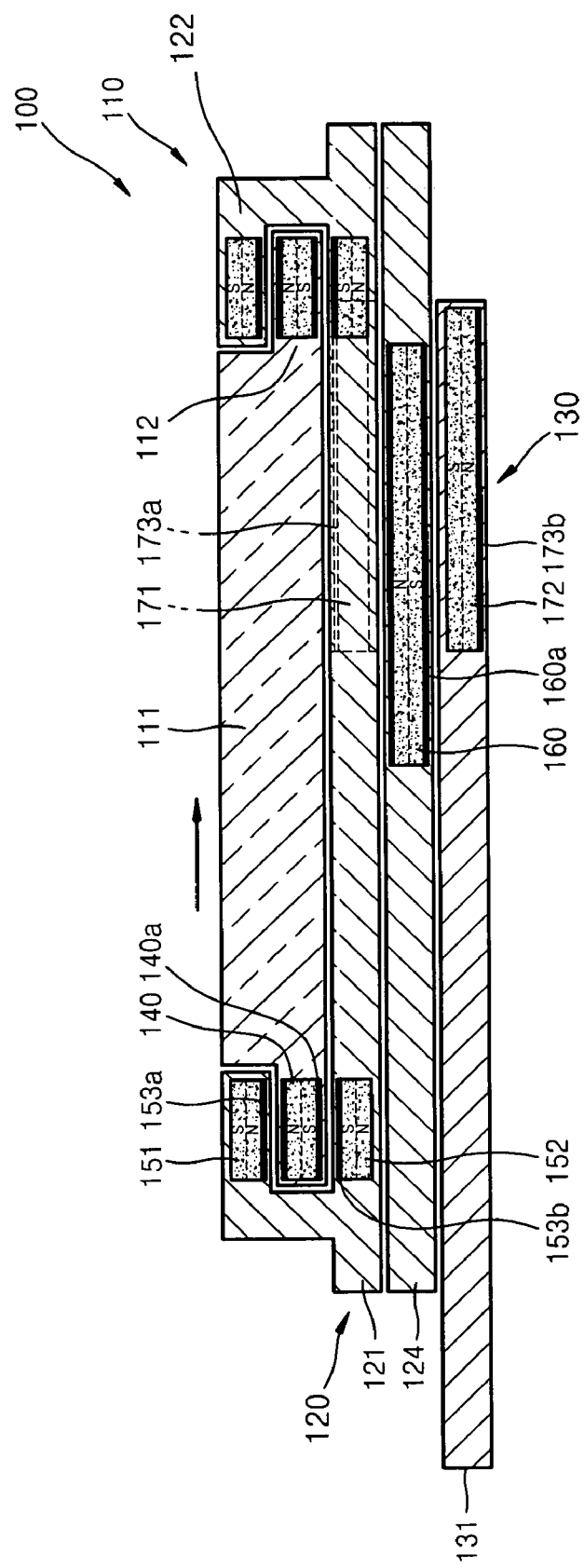
FIG. 7 is a cross-sectional view illustrating the sliding structure of FIG. 2 in the case where a third sliding member is at an intermediate position, according to an embodiment of the present invention.
Figure 8:
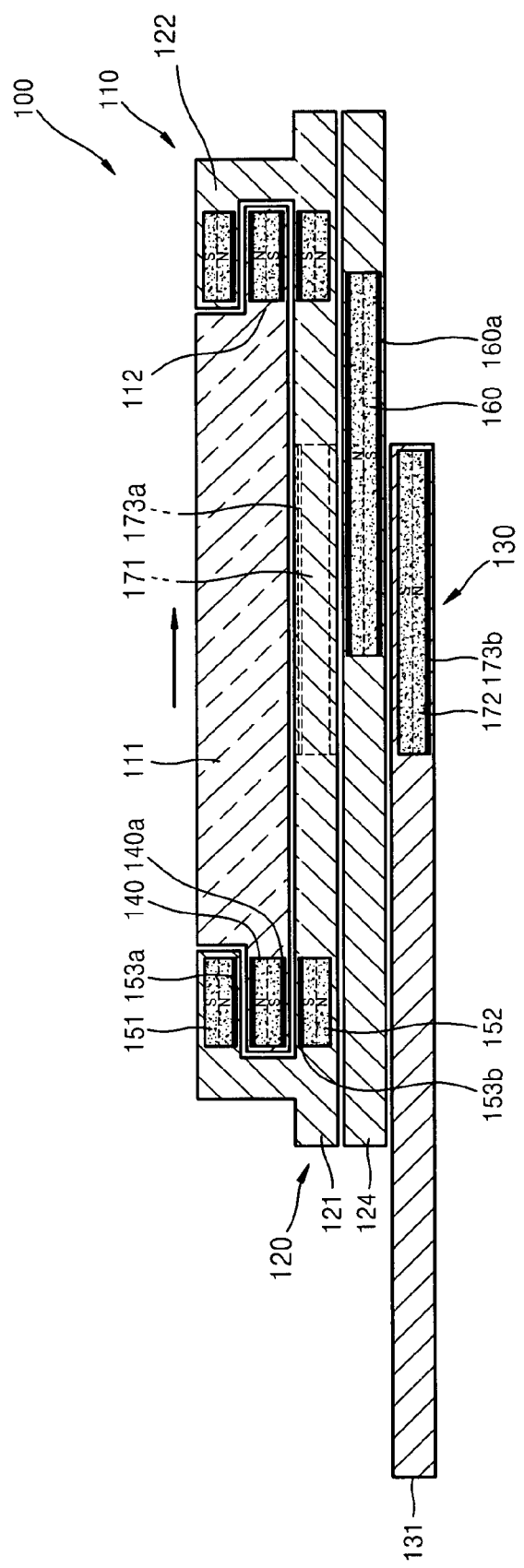
FIG. 8 is a cross-sectional view illustrating the sliding structure of FIG. 2 in the case there the third sliding member is at an end position, according to an embodiment of the present invention.

FIG. 4 is a cross-sectional view illustrating the third sliding member 130 in the case where the sliding structure 100 is at a start position, according to an embodiment of the present invention. FIG. 7 is a cross-sectional view illustrating the sliding structure 100 illustrated in FIG. 2 in the case where the third sliding member 130 is at an intermediate position, according to an embodiment of the present invention. FIG. 8 is a cross-sectional view illustrating the sliding structure 100 of FIG. 2 in the case where the third sliding member 130 is at an end position, according to an embodiment of the present invention.

Referring to FIG. 4, the third sliding member 130 is at the start position. The third sliding member 130 is disposed on a lower part of the second sliding member 120.

As illustrated in FIG. 4, a part of the third magnet portion 160 is disposed between the fourth magnet portions 171 and 172. In such a case, a repulsive force acts between each of the fourth magnet portions 171 and 172, and the third magnet portion 160 due to the arrangement of the magnetic poles of the fourth magnet portions 171 and 172, and the third magnet portion 160.

Accordingly, the third sliding member 130 can be stably disposed at the start position due to the repulsive force. Since the third sliding member 130 is lifted from a surface of the second sliding member 120 due to the repulsive force, sliding friction can be reduced.

When a user pushes the third sliding member 130 to the left at the position illustrated in FIG. 4, an entire part of the third magnet portion 160 is smoothly disposed between the fourth magnet portions 171 and 172. Then, a repulsive force is gradually increased between each of the fourth magnet portions 171 and 172, and the third magnet portion 160.

In such a case, although the user pushes the third sliding member 130 to the left at a rapid speed, the repulsive force generated between each of the fourth magnet portions 171 and 172, and the third magnet portion 160 prevents the third sliding member 130 from moving suddenly. Accordingly, an impact on the sliding structure 100 can be prevented. In addition, since the third sliding member 130 is lifted from the second sliding member 120 due to the repulsive force, friction can be reduced in the sliding operation.

When the user continues to push the third sliding member 130 to the left, the sliding structure 100 reaches the position illustrated in FIG. 7. As shown in FIG. 7, the third sliding member 130 is at the intermediate position. As illustrated in FIG. 7, since most of the third magnet portion 160 is disposed between the fourth magnet portions 171 and 172, a strong repulsive force acts between each of the fourth magnet portions 171 and 172, and the third magnet portion 160.

When the user continues to push the third sliding member 130 to the left in the position illustrated in FIG. 7, although the pushing force is not strong, the third sliding member 130 can be pushed to the left due to the repulsive force generated between each of the fourth magnet portions 171 and 172, and the third magnet portion 160.

In such a case, an excessive impact of the sliding structure 100 can be prevented since it is not necessary to apply a force to push the third sliding member 130 to the left. In addition, since the third sliding member 130 is lifted from the second sliding member 120 due to the repulsive force, sliding friction can be reduced.

When the user continues to push the third sliding member 130 to the left, the sliding structure 100 reaches the position illustrated in FIG. 8. As shown in FIG. 8, a repulsive force acts between the third magnet portion 160, and each of the fourth magnet portions 171 and 172 due to the arrangement of the magnetic poles of the fourth magnet portions 171 and 172, and the third magnet portion 160.

Accordingly, the third sliding member 130 can be stably disposed at the end position due to the repulsive force. Since the third sliding member 130 is lifted from the second sliding member 120 due to the repulsive force, when the user again pushes the third sliding member 130 downwards, sliding friction can be reduced.

In this example of the present embodiment, the case where the third sliding member 130 is pushed to the left has been described, but the present invention is not limited to this arrangement. That is, according to an embodiment of the present invention, when the third sliding member 130 at the end position illustrated in FIG. 6 is pushed to the right, the sliding operation of the sliding structure 100 is performed in the same way except for the sliding direction.

As described above, since the sliding structure 100 is configured according to the above structure, an impact on the sliding structure 100 can be prevented. In the sliding structure 100, one of the first sliding member 110 and the second sliding member 120 may be integrally formed with the primary body, and the other member of the first sliding member 110 and the second sliding member 120 may be integrally formed with the secondary body. In such a case, the volume of the sliding structure can be reduced, and thus a thin electronic device, which can smoothly perform a sliding operation, can be realized.

Since the sliding structure 100 is configured according to the above structure, the first, second and third sliding members 110, 120 and 130 can be lifted due to the magnetic force, and thus sliding friction can be reduced. Thus, a force required for the sliding operation can be reduced.

Hereinafter, a sliding structure 200 will be described with reference to FIGS. 9 and 10, according to another embodiment of the present invention, in terms of differences therein compared to the above-described embodiment.

Figure 9:
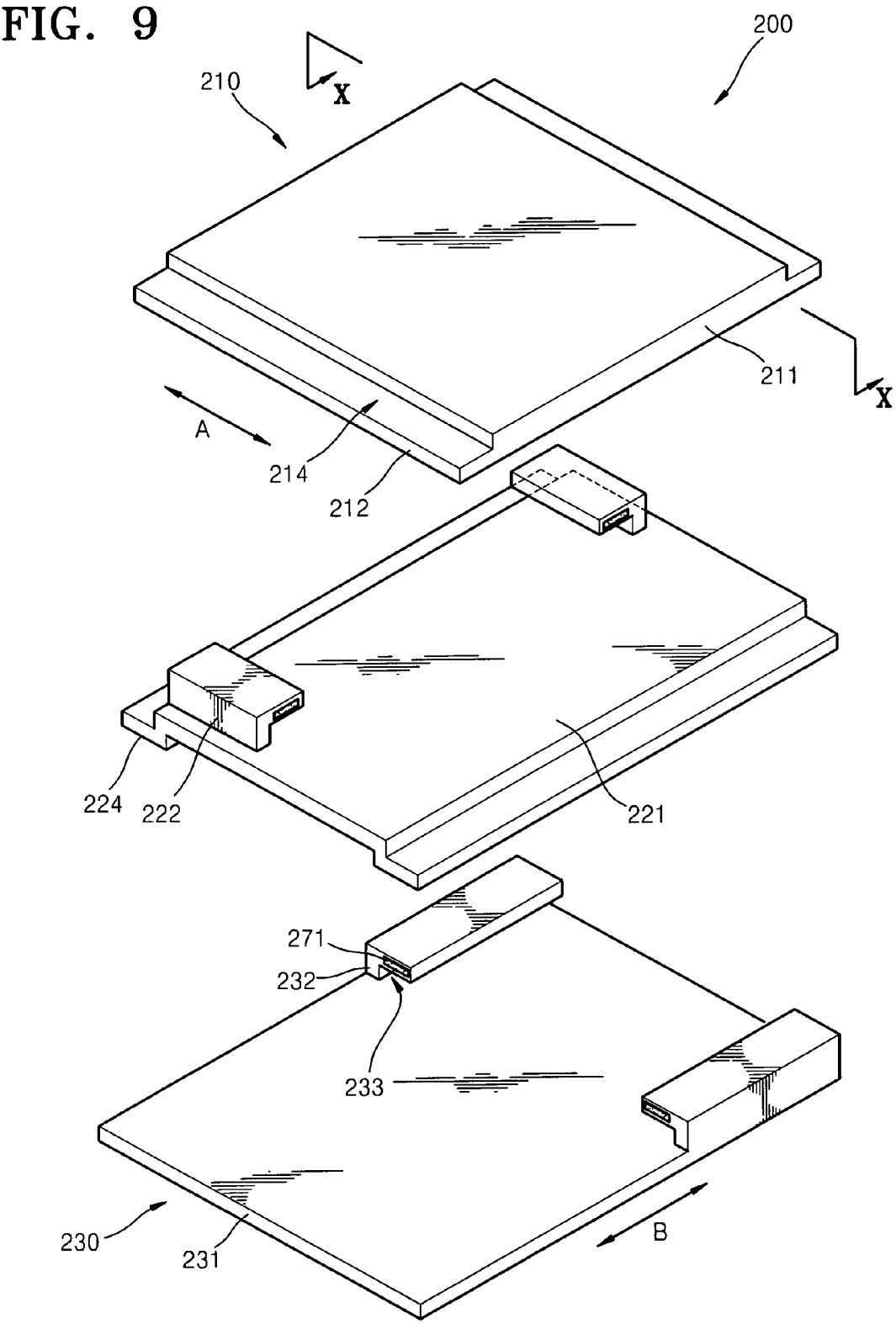
FIG. 9 is a perspective view of an example of a sliding structure according to another embodiment of the present invention.

FIG. 9 is a perspective view of the sliding structure 200 according to another embodiment of the present invention. FIG. 10 is a cross-sectional view of the sliding structure 200 taken along a line X-X of FIG. 9.

Figure 10:
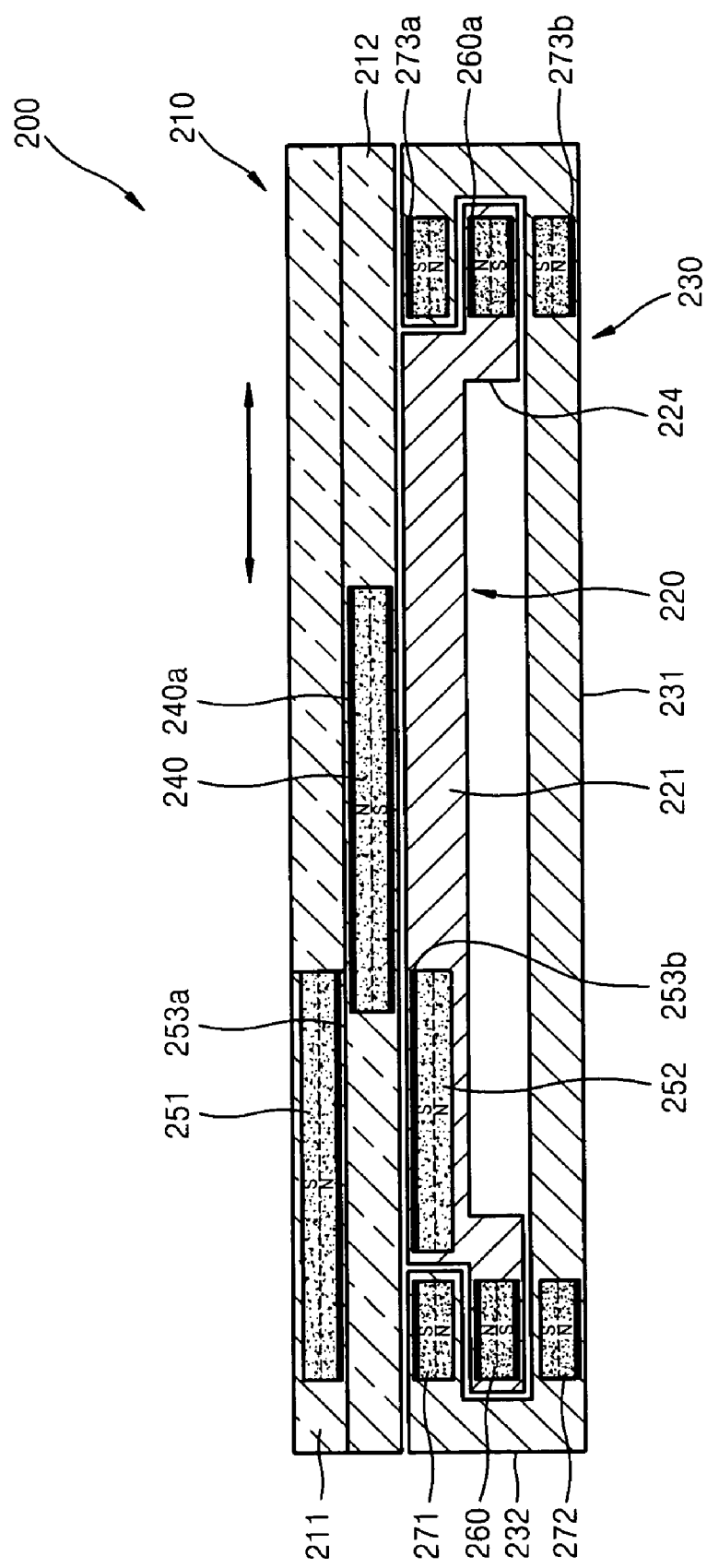
FIG. 10 is a cross-sectional view of the sliding structure taken along a line X-X of FIG. 9.

Referring to FIGS. 9 and 10, the sliding structure 200 includes a first sliding member 210, a second sliding member 220, a third sliding member 230, a first magnet portion 240, a pair of second magnet portions 251 and 252, a third magnet portion 260, and a pair of fourth magnet portions 271 and 272.

The first sliding member 210 is formed of a non-magnetic material such as an aluminum alloy, and includes a first support portion 211 and a first guide portion 212. The first support portion 211 has a flat or substantially flat shape. The first guide portion 212 extends from two sides of a lower part of the first support portion 211.

The second sliding member 220 is formed of a non-magnetic material such as an aluminum alloy, and includes a second support portion 221, a first receiving portion 222 and a second guide portion 224.

The second support portion 221 has a flat or substantially flat shape. The first receiving portion 222 is disposed on an upper surface of two sides of the second support portion 221.

The first receiving portion 222 has a ⌐⌐ shape or a substantially similar shape, and a first receiving groove 223 is disposed in the first receiving portion 222. Since the first guide portion 212 is inserted into the first receiving groove 223 when the sliding structure 200 is assembled, the first guide portion 212 functions as a sliding guider.

The second guide portion 224 extends from two sides of a lower part of the second support portion 221 in a perpendicular or substantially perpendicular direction to a direction in which the first receiving portion 222 is formed. In particular, in the sliding structure 200, the second guide portion 224 is formed along the entire two sides of the lower part of the second sliding member 220. The characteristic of the sliding structure 200 characterized by the structure of the second guide portion 224 will be described later.

The sliding structure 200 includes the first sliding member 210, the second sliding member 220 and the third sliding member 230, wherein the first sliding member 210 and the third sliding member 230 slide along the second sliding member 220 in directions perpendicular or substantially perpendicular to each other.

To achieve this, the first guide portion 212 and the first receiving portion 222 are respectively formed on the first sliding member 210 and the second sliding member 220 so that the first sliding member 210 may slide along the second sliding member 220 in one direction. The second guide portion 224 and the second receiving portion 232 are respectively formed on the second sliding member 220 and the third sliding member 230 so that the third sliding member 230 may slide along the second sliding member 220 in a perpendicular or substantially perpendicular direction to a sliding direction in which the third sliding member 230 slides along the second sliding member 220.

That is, as illustrated in FIG. 9, the first sliding member 210 is configured so as to slide along the second sliding member 220 in a direction A. In addition, the third sliding member 230 is configured so as to slide along the second sliding member 220 in a direction B.

The third sliding member 230 is formed of a non-magnetic material such as an aluminum alloy, and includes a third support portion 231 and a second receiving portion 232. The third support portion 231 has a flat or substantially flat shape, and a second receiving portion 232 is disposed on an upper surface of two sides of the third support portion 231.

The second receiving portion 232 has a ⌐⌐ shape or a substantially similar shape, and a second receiving groove 233 is disposed in the second receiving portion 232. Since the second guide portion 224 is inserted into the second receiving groove 233 when the sliding structure 200 is assembled, the second guide portion 224 functions as a sliding guider.

The first magnet portion 240 is embedded in the first guide portion 212. The first magnet portion 240 is mounted on a middle part of the sliding stroke of the first guide portion 212 as illustrated in FIG. 9, in order to facilitate the sliding operation.

The first magnet portion 240 has a square or substantially square shape, and magnetic poles of the first magnet portion 240 are arranged so as to be perpendicular or substantially perpendicular to the sliding direction. Furthermore, the first magnet portion 240 is arranged so that the N pole and the S pole respectively correspond to an upper part and a lower part thereof.

Although the first magnet portion 240 is disposed so that the N pole and the S pole respectively correspond to the upper part and the lower part thereof, the present is not limited to this arrangement. That is, according to an example of the present invention, the first magnet portion 240 may be disposed so that the S pole and the N pole respectively correspond to the upper part and the lower part thereof. In such a case, the second magnet portions 251 and 252, the third magnet portion 260 and the fourth magnet portions 271 and 272, which correspond to the first magnet portion 240, may be arranged so that the magnetic poles thereof properly match the magnetic poles of the first magnet portion 240.

The second magnet portions 251 and 252 are embedded in the first receiving portion 222. Each of the second magnet portions 251 and 252 in this example has a square or substantially shape. The second magnet portions 251 and 252 are arranged on an upper part and a lower part of a second receiving portion 232, respectively. At this time, the first magnet portion 240 is disposed between the second magnet portions 251 and 252, and thus the second magnet portions 251 and 252 operate in conjunction with the first magnet portion 240.

The magnetic poles of the second magnet portions 251 and 252 are arranged so that the magnetic poles thereof may be arranged in a perpendicular or substantially perpendicular direction to a sliding direction, and arrangement of the magnetic poles of the second magnetic portion 251 and 252 may be the same. That is, each of the second magnet portions 251 and 252 is arranged so that the S pole and the N pole respectively correspond to an upper part and a lower part thereof, as illustrated in FIG. 10.

The magnetic poles of the second magnet portions 251 and 252 are arranged in a direction opposite to that of the magnetic poles of the first magnet portion 240. Thus, since a repulsive force acts between each of the second magnet portions 251 and 252, and the first magnet portion 240, a stable sliding operation can be realized.

In the sliding structure 200, the length of a second magnet portion 251 disposed on the upper part of the second receiving portion 232 is different from the length of a second magnet portion 252 disposed on the lower part of the second receiving portion 232. That is, the second magnet portion 251 may extend above the second guide portion 224. On the other hand, the second magnet portion 252 is shorter than the second magnet portion 251 by as much as the width of the second guide portion 224 due to the second guide portion 224. An example in the difference in length between the second magnet portion 251 and the second magnet portion 252 is compensated for by a fourth magnet portion 271 that will be described later.

The third magnet portion 260 is embedded in the second guide portion 224. The third magnet portion 260 is mounted on a middle part of a sliding stroke of the second guide portion 224 as illustrated in FIG. 9, in order to facilitate a sliding operation. The third magnet portion 260 in this example has a square or substantially square shape, and the magnetic poles of the third magnet portion 260 are arranged so as to be perpendicular or substantially perpendicular to a sliding direction. Furthermore, the third magnet portion 260 is arranged so that the N pole and the S pole respectively correspond to an upper part and a lower part thereof.

Although the third magnet portion 260 is arranged so that the N pole and the S pole respectively correspond to the upper part and the lower part thereof, the present invention is not limited to this arrangement. That is, according to an example of the present invention, the third magnet portion 260 may be arranged so that the S pole and the N pole respectively correspond to the upper part and the lower part thereof. In such a case, the first magnet portion 240, the second magnet portions 251 and 252, and the fourth magnet portions 271 and 272, which correspond to the third magnet portion 260, may be arranged so that the magnetic poles thereof properly match the magnetic poles of the third magnet portion 260 since the magnetic poles of the second magnet portion 252 have to be arranged in the same manner as those of the fourth magnet portion 271.

The fourth magnet portions 271 and 272 are embedded in the second receiving portion 232. Each of the fourth magnet portions 271 and 272 has a square or substantially square shape. The fourth magnet portions 271 and 272 are arranged on an upper part and a lower part of the second receiving portion 232. At this time, the third magnet portion 260 is disposed between the fourth magnet portions 271 and 272, and thus the fourth magnet portions 271 and 272 operate in conjunction with the third magnet portion 260.

The fourth magnet portions 271 and 272 are arranged so that the magnetic poles thereof may be arranged in a direction perpendicular or substantially perpendicular to a sliding direction, and the arrangement of the magnetic poles of the fourth magnet portions 271 and 272 may be the same. That is, each of the fourth magnet portions 271 and 272 is arranged so that the S pole and the N pole respectively correspond to an upper part and an lower part thereof, as illustrated in FIG. 10.

The magnetic poles of the fourth magnet portions 271 and 272 are arranged in a direction opposite to that of the magnetic poles of the third magnet portion 260. Thus, since a repulsive force acts between each of the fourth magnet portions 271 and 272, and the third magnet portion 260, a stable sliding operation can be realized.

The arrangement of the magnetic poles of the fourth magnet portions 271 and 272 is the same as the arrangement of the magnetic poles of the second magnet portions 251 and 252 in order to compensate for the difference in length between the second magnet portion 251 and the second magnet portion 252, as described above. That is, the second magnet portion 251 formed in the first receiving portion 222 can be formed to correspond to a left end of the second sliding member 220, as illustrated in FIG. 10. On the other hand, the second magnet portion 252 formed in the second support portion 221 is formed to be shorter than the second magnet portion 251 by a predetermined length due to the second guide portion 224. However, when the length of the second magnet portion 252 is the same as that of the second magnet portion 251, a uniform magnetic force can be generated, and a sliding distance can be extended. Accordingly, the magnetic poles of the fourth magnet portion 271 are the same as those of the second magnet portion 252, and thus the fourth magnet portion 271 can function as an extension of the second magnet portion 252.

As a result of the above structure, a sliding length, by which the third sliding member 230 slides along the second sliding member 220, can be extended. In addition, by extending the sliding length of the third sliding member 230, an available space is increased to thereby improve convenience for a user.

In the sliding structure 200, one of the first sliding member 210, the second sliding member 220 and the third sliding member 230 is embedded in a primary body in which a main chip set of an electronic device such as a cellular phone, a camera, a PMP, a PC, or the like, and an electrical portion such as a battery are integrated, and the other members of the first sliding member 210, the second sliding member 220 and the third sliding member 230 are embedded in a secondary body having a relatively simple structure. Accordingly, the sliding operation of the sliding structure 200 is performed.

That is, as illustrated in FIG. 9, the first sliding member 210 is mounted on the primary body, the second sliding member 220 is mounted on a circuit board, and the third sliding member 230 is mounted on the secondary body on which a button portion is formed.

In addition, one of the first sliding member 210, the second sliding member 220 and the third sliding member 230 may be integrally formed with the primary body, and the other members of the first sliding member 210, the second sliding member 220 and the third sliding member 230 may be integrally formed with the secondary body. In such a case, the volume of the sliding structure 200 can be reduced, and thus a thin electronic device, which can smoothly perform a sliding operation, can be realized.

The sliding structure 200 includes the first sliding member 210 and the second sliding member 220, which respectively include the first guide portion 212 and the first receiving portion 222 in order to slide in one direction, and the second sliding member 220 and the third sliding member 230, which respectively include the second guide portion 224 and the second receiving portion 232 in order to slide in a direction perpendicular or substantially perpendicular to the direction in which the first sliding member 210 slides along the second sliding member 220. That is, as illustrated in FIG. 9, the first sliding member 210, the second sliding member 220 and the third sliding member 230 are configured so that the first sliding member 210 may slide along the second sliding member 220 in the direction A, and simultaneously the third sliding member 230 may slide along the second sliding member 220 in the direction B.

Accordingly, since the sliding structure 200 is extendable in horizontal and vertical directions of an electronic device including the sliding structure 200, the electronic device can have an increased available space, and can have various extension key pads mounted thereon. Since a portion of the sliding structure 200, which slides in the direction A, and a portion of the sliding structure 200, which slides in the direction B, partially overlap each other, the thickness of the sliding structure 200 can be reduced.

Figure 11:
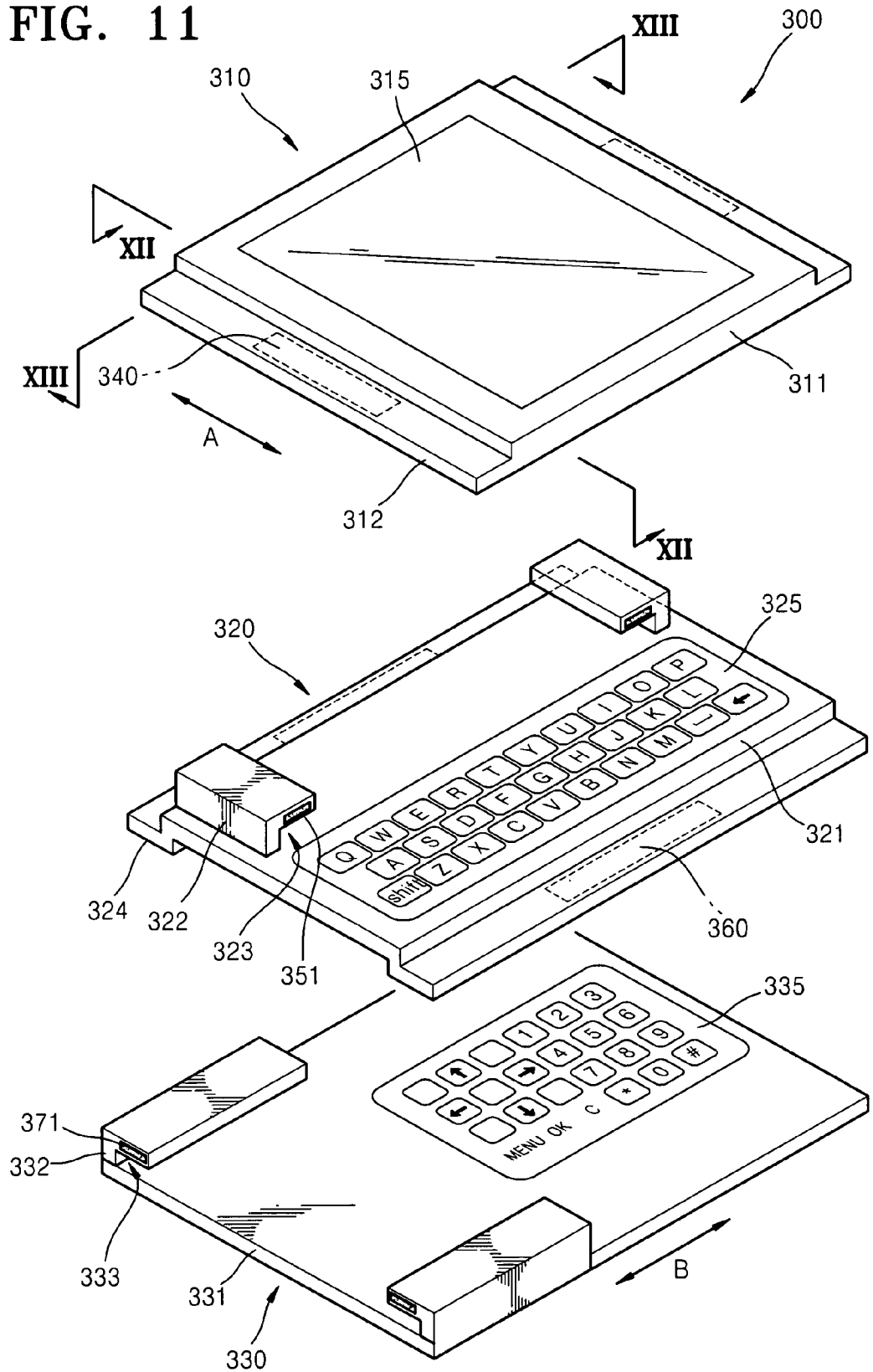
FIG. 11 is a perspective view of a sliding structure, according to another embodiment of the present invention.
Figure 12:
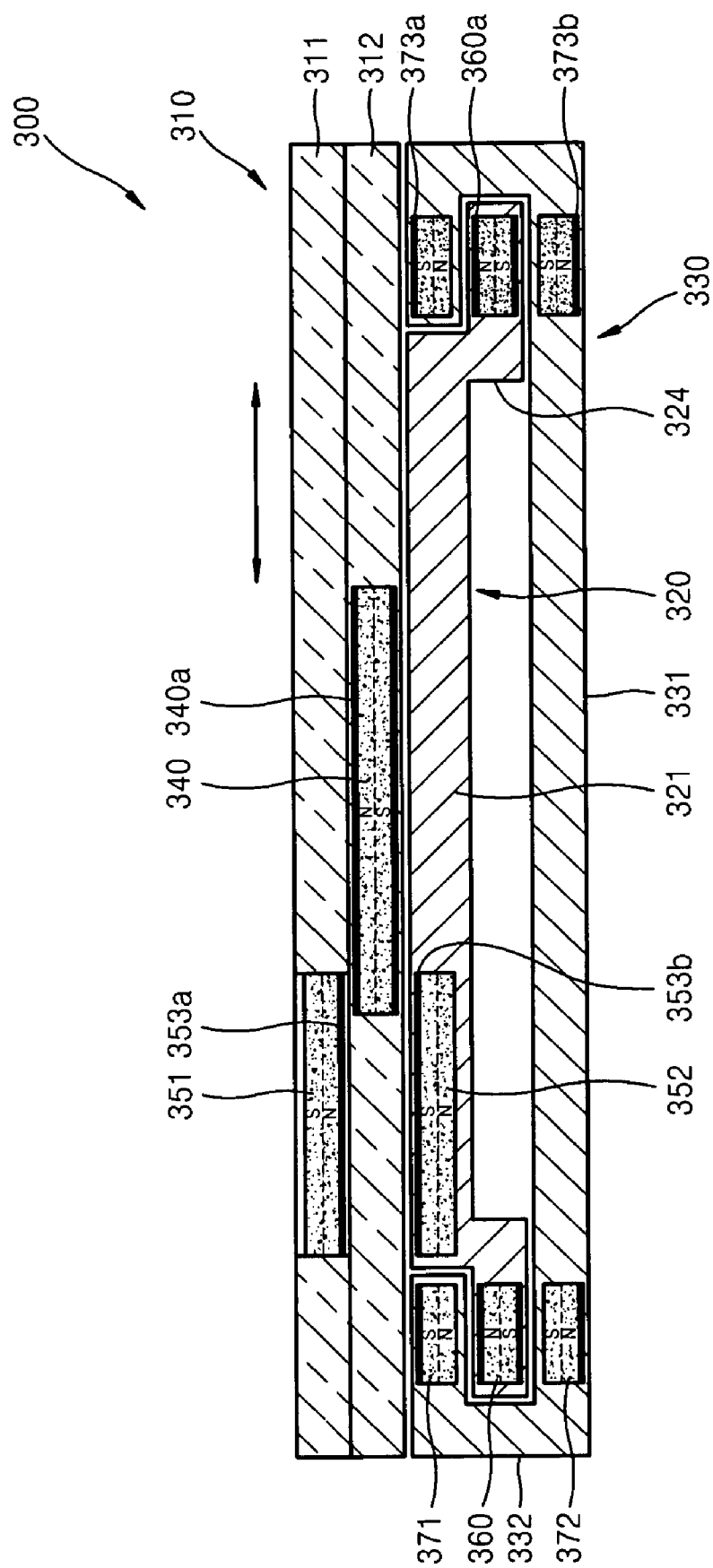
FIG. 12 is a cross-sectional view of the sliding structure taken along a line XII-XII of FIG. 11.
Figure 13:
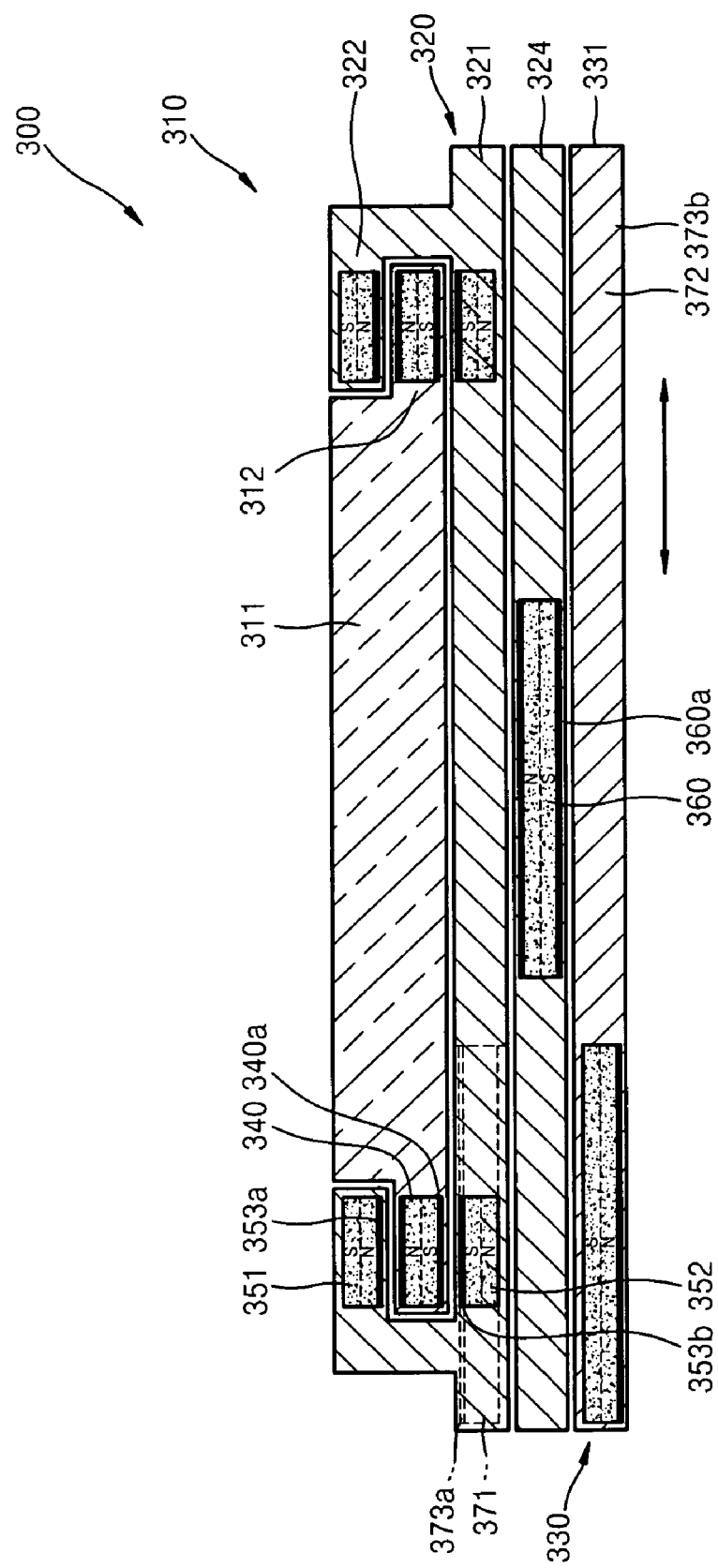
FIG. 13 is a cross-sectional view of the sliding structure taken along a line XIII-XIII of FIG. 11.

FIG. 11 is a perspective view of a sliding structure 300, according to another embodiment of the present invention. FIG. 12 is a cross-sectional view of the sliding structure 300 taken along a line XII-XII of FIG. 11. FIG. 13 is a cross-sectional view of the sliding structure 300 taken along a line XIII-XIII of FIG. 11.

Referring to FIGS. 11 and 12, the sliding structure 300 includes a first sliding member 310, a second sliding member 320, a third sliding member 330, a first magnetic portion 340, a pair of second magnet portions 351 and 352, a third magnet portion 360, and a pair of fourth magnet portions 371 and 372.

A display unit 315 is further formed on the first sliding member 310. An extension key pad 325 is further formed on the second sliding member 320. A number key pad 335 is further formed on the third sliding member 330.

The first sliding member 310 is formed of a non-magnetic material such as an aluminum alloy, and includes a first support portion 311 and a first guide portion 312.

The first support portion 311 has a flat or substantially flat shape. The first guide portion 312 extends from two sides of a lower part of the first support portion 311.

The first support portion 311 and the first guide portion 312 may be manufactured by using various methods such as a die casting method or a method in which a flat or substantially flat material is bent and plastic-deformed, but the present invention is not limited to this arrangement.

The display unit 315 (e.g., a liquid crystal display (LCD), an organic light emitting diode (OLED), or the like) may be further formed on the first support portion 311. The second sliding member 320 is formed of a non-magnetic material such as an aluminum alloy, and includes a second support portion 321, a first receiving portion 322 and a second guide portion 324.

The second support portion 321 has a flat or substantially flat shape. The first receiving portion 322 is disposed on an upper surface of two sides of the second support portion 321.

The first receiving portion 322 has a 「⊏」shape or a substantially similar shape, and a first receiving groove 323 is disposed in the first receiving portion 322. Since the first guide portion 312 is inserted into the first receiving groove 323 when the sliding structure 300 is assembled, the first guide portion 312 functions as a sliding guider.

The first receiving portion 322 extends on both sides of a lower part of the second support portion 321 in a direction perpendicular or substantially perpendicular to a direction in which the first receiving portion 322 is formed. In the sliding structure 300, the second guide portion 324 is formed on both entire sides of the lower part of the second sliding member 320. The characteristic of the sliding structure 300 characterized by the structure of the second guide portion 324 will be described later.

The sliding structure 300 includes the first sliding member 310, the second sliding member 320 and the third sliding member 330, wherein the second sliding member 320 and the third sliding member 330 slide along the second sliding member 320 in directions perpendicular or substantially perpendicular to each other.

To achieve this, the first guide portion 312 and the first receiving portion 322 are respectively formed on the first sliding member 310 and the second sliding member 320 so that the first sliding member 310 may slide along the second sliding member 320 in one direction. The second guide portion 324 and the second receiving portion 332 are respectively formed on the second sliding member 320 and the third sliding member 330 so that the third slide member 330 may slide along the second sliding member 320 in a direction perpendicular or substantially perpendicular to a sliding direction in which the first sliding member 310 slides along the second sliding member 320.

That is, as illustrated in FIG. 11, the first sliding member 310 is configured so as to slide along the second sliding member 320 in a direction A. In addition, the third sliding member 330 is configured so as to slide along the second sliding member 320 in a direction B.

The second support portion 321, the first receiving portion 322 and the second guide portion 324 may be manufactured by using various methods such as a die casting method or a method in which a flat or substantially flat material is bent and plastic-deformed, but the present invention is not limited to this arrangement.

The extension key pad 325 (e.g., an English key pad) may be further formed on the second support portion 321. As illustrated in FIG. 11, the readable display direction, which are directions in which a user can read key pads without having to rotate the sliding structure, of letters, etc., which are displayed on the extension key pad 325, is parallel or substantially parallel to a sliding direction of the first receiving portion 322. Since the extension key pad 325 is included in the sliding structure 300, letters or the like can be easily input to an electronic device.

The third sliding member 330 is formed of a non-magnetic material such as an aluminum alloy, and includes a third support portion 331 and the second receiving portion 332. The first sliding member 310, the second sliding member 320 and the third sliding member 330 are formed of an aluminum alloy, but the present invention is not limited to this arrangement. For example, the first sliding member 310, the second sliding member 320 and the third sliding member 330 may be formed of plastic resin, or may be formed of different materials.

The third support portion 331 has a flat or substantially flat shape, and the second receiving portion 332 is disposed on an upper surface of two sides of the third support portion 331.

The second receiving portion 332 has a ⌐ shape or a substantially similar shape, and a second receiving groove 333 is disposed in the second receiving portion 332. Since the second guide portion 324 is inserted into the second receiving groove 333 when the sliding structure 300 is assembled, the second guide portion 324 functions as a sliding guider.

In addition, the number key pad 335 may be further formed on the third support portion 331. If the readable display direction of numbers, etc., which are displayed on the number key pad 335, is consistently parallel or substantially parallel to a sliding direction of the second receiving portion 332, like a convention sliding structure, the extension key pad 325 and the number key pad 335 are arranged perpendicular or substantially perpendicular to each other. In such a case, when a user uses the extension key pad 325 and the number key pad 335, the user have to see the number key pad 335 in a direction perpendicular or substantially perpendicular to the extension key pad 325. Accordingly, in the sliding structure 300, the readable display direction of the numbers, etc., which are displayed on the number key pad 335, can be changed.

For example, when the user uses a telephone function, that is, when only the third sliding member 330 is pulled with respect to the second sliding member 320 so as to be used, the readable display direction of the number key pad 335 is disposed parallel or substantially parallel to the second receiving portion 332. However, when the user uses the number key pad 335 and the extension key pad 325, that is, when both of the first sliding member 310 and the third sliding member 330 are pulled with respect to the second sliding member 320, the readable display direction of the numbers, etc. of the number key pad 335 are changed to a direction perpendicular or substantially perpendicular to the sliding direction of the second receiving portion 332, and then the numbers, etc. of the number key pad 335 are displayed. That is, the numbers, etc. of the number key pad 335 is rotated by 90 degrees or about 90 degrees, and thus the letters, etc. of the extension key pad 325 of the second sliding member 320 are disposed parallel or substantially parallel to the numbers, etc. of the number key pad 335 of the third sliding member 330. As a result of this structure, when the user uses a letter type function, the letters, etc. of the extension key pad 325 and the numbers, etc. of the number key pad 335 are displayed in the same direction, thereby improving convenience for a user.

A lubricant may be coated on a surface of the first guide portion 312, an inner surface of the first receiving portion 322, a surface of the second guide portion 324, an inner surface of the second receiving portion 332, or the like, in order to further reduce friction during a sliding operation. For example, a ceramic material may be coated on a portion with which contact can occur during a sliding operation.

The first magnetic portion 340 is embedded in the first guide portion 312. The first magnetic portion 340 is a permanent magnet, but the present invention is not limited to this type of magnet. That is, the first magnetic portion 340 may be an electromagnet, or the like.

The first magnetic portion 340 is embedded in the first guide portion 312, but the present invention is not limited to this arrangement. That is, the first magnetic portion 340 may be mounted on the first guide portion 324.

The first magnetic portion 340 is mounted on a middle part of the sliding stroke of the first guide portion 312 as illustrated in FIG. 11, in order to facilitate the sliding operation.

The first magnetic portion 340 has a square or substantially square shape, and magnetic poles of the first magnet portion 340 are arranged so as to be perpendicular or substantially perpendicular to the sliding direction. Furthermore, the first magnetic portion 340 is arranged so that the N pole and the S pole respectively correspond to an upper part and a lower part thereof.

Although the first magnetic portion 340 is disposed so that the N pole and the S pole respectively correspond to the upper part and the lower part thereof, the present invention is not limited to this arrangement. That is, according to an example of the present invention, the first magnetic portion 340 may be disposed so that the S pole and the N pole respectively correspond to the upper part and the lower part thereof. In such a case, the second magnet portions 351 and 352 corresponding to the first magnet portion 340 may be arranged so that the magnetic poles thereof properly match the magnetic poles of the first magnet portion 340.

A magnetic shield 340a is mounted on an upper surface and a lower surface of the first magnetic portion 340.

The magnetic shield 340a is mounted on the upper surface and lower surface of the first magnetic portion 340, but the present invention is not limited to this arrangement. That is, the magnetic shield 340a may be further mounted on a side surface of the first magnetic portion 340. In addition, the magnetic shield 340a may be mounted on a part of the first guide portion 312 in which the first magnet portion 340 is mounted, instead of on a surface of the first magnet portion 340. In such a case, the magnetic shield 340a is placed on an appropriate part of the first guide portion 312, and then the first magnet portion 340 may be mounted on the first guide portion 312.

The magnetic shield 340a is formed of a ferromagnetic substance, such as an AD-MU alloy or the like, and shields the magnetic lines of force generated from the first magnetic portion 340. The magnetic shield 340a is formed of a ferromagnetic substance, but the present invention is not limited to this type of material. That is, according to an example of the present invention, the magnetic shield 340a may be formed of a non-magnetic material.

The second magnet portions 351 and 352 are embedded in the first receiving portion 322. The second magnet portions 351 and 352 may each be a permanent magnet, but the present invention is not limited to this type of magnet That is, according to an example of the present invention, the second magnet portions 351 and 352 may each be an electromagnet, or the like.

The second magnet portions 351 and 352 are embedded in the first receiving portion 322, but the present invention is not limited to this arrangement. That is, according to an example of the present invention, the second magnet portions 351 and 352 may be mounted on a surface of the first receiving portion 322.

Each of the second magnet portions 351 and 352 has a square or substantially square shape. The second magnet portions 351 and 352 are arranged on an upper part and a lower part of the second receiving portion 332. At this time, the first magnetic portion 340 is disposed between the second magnet portions 351 and 352, and thus the second magnet portions 351 and 352 operate in conjunction with the first magnetic portion 340.

The second magnet portions 351 and 352 are arranged so that the magnetic poles thereof may be arranged in a direction perpendicular or substantially perpendicular to a sliding direction, and arrangement of the magnetic poles of the second magnet portions 351 and 352 may be the same. That is, each of the second magnet portions 351 and 352 is arranged so that the S pole and N pole respectively correspond to an upper part and a lower part of each second magnet portion 351 and 352, as illustrated in FIG. 13.

The magnetic poles of the second magnet portions 351 and 352 are arranged in a direction opposite to that of the magnetic poles of the first magnetic portion 340. Thus, since a repulsive force acts between each of the second magnet portions 351 and 352, and the first magnetic portion 340, a stable sliding operation can be realized.

In the sliding structure 300, the length of a second magnet portion 351 disposed on the upper part of the second receiving portion 332 is different from the length of a second magnet portion 352 disposed on the lower part of the second receiving portion 32. That is, the second magnet portion 351 may extend above the second guide portion 324. On the other hand, the second magnet portion 352 is shorter than the second magnet portion 351 by the width of the second guide portion 324 due to the second guide portion 324. The difference in length between the second magnet portion 351 and the second magnet portion 352 is compensated for by a fourth magnet portion 371 that will be described later.

The first magnetic portion 340, and the second magnet portions 351 and 352 are arranged so that a perpendicular or substantially perpendicular imaginary line, which connects surfaces of the second magnet portions 351 and 352, which face each other, passes at least a part of the first magnetic portion 340 throughout the entire sliding operation. As a result of this structure, a repulsive force always acts between the first magnetic portion 340 and each of the second magnet portions 351 and 352. Accordingly, friction is minimized when the second sliding member 320 including the second magnet portions 351 and 352 slides along the first sliding member 310 including the first magnetic portion 340 since the second sliding member 320 is lifted from a surface of the first sliding member 310 due to a repulsive force. In such a case, the degree of the lifting is proportional to the repulsive magnetic force, and more particularly, to the size and property of the magnet used.

In the present embodiment, the first magnetic portion 340, and the second magnet portions 351 and 352 are arranged so that the perpendicular or substantially perpendicular imaginary line, which connects the surfaces of the second magnet portions 351 and 352, which face each other, passes at least a part of the first magnetic portion 340 throughout the entire sliding operation, but the present invention is not limited to this arrangement. That is, according to an example of the present invention, the perpendicular or substantially perpendicular imaginary line may not pass through the first magnetic portion 340. However, in such a case, the first magnetic portion 340, and each of the second magnet portions 351 and 352 are arranged at a smaller distance from each other than in the previous case, so that a repulsive force generated between the first magnetic portion 340, and each of the second magnet portions 351 and 352 may increase in order to decrease sliding friction.

Magnetic shields 353a and 353b are arranged on a lower surface of the second magnet portion 351 and an upper surface of the second magnet portion 352, respectively. Since the materials and functions of the magnetic shields 353a and 353b are the same as those of the magnetic shield 340a, a detailed description of the magnetic shields 353a and 353b will be omitted here.

The magnetic shields 353a and 353b are arranged only on the lower surface of the second magnet portion 351 and the upper surface of the second magnet portion 352, respectively, but the present invention is not limited to this arrangement. That is, the magnetic shields 353a and 353b may be further disposed on an upper surface of the second magnet portion 351 and a lower surface of the second magnet portion 352, and on side surfaces of the second magnet portions 351 and 352. In addition, the magnetic shields 353a and 353b may be disposed in a part of the first receiving portion 322 in which the second magnet portions 351 and 352 are received, instead of on surfaces of the second magnet portions 351 and 352. In such a case, the magnetic shields 353a and 353b are disposed in an appropriate part of the first receiving portion 322, and then the second magnet portions 351 and 352 are disposed in the first receiving portion 322.

The third magnet portion 360 is embedded in the second guide portion 324. The third magnet portion 360 is a permanent magnet, but the present invention is not limited to this type of magnet. That is, the third magnet portion 360 may be an electromagnet, or the like.

The third magnet portion 360 is embedded in the second guide portion 324, but the present invention is not limited to this arrangement. That is, according to an example of the present invention, the third magnet portion 360 may be formed on the second guide portion 324.

The third magnet portion 360 is mounted on a middle part of the sliding stroke of the second guide portion 324 as illustrated in FIG. 11, in order to facilitate the sliding operation. The third magnet portion 360 has a square or substantially square shape, and magnetic poles of the third magnet portion 360 are arranged so as to be perpendicular or substantially perpendicular to the sliding direction. Furthermore, the third magnet portion 360 is arranged so that the N pole and the S pole respectively correspond to an upper part and a lower part thereof.

Although the third magnet portion 360 is disposed so that the N pole and the S pole respectively correspond to the upper part and the lower part thereof, the present invention is not limited to this arrangement. That is, according to an example of the present invention, the third magnet portion 360 may be arranged so that the S pole and the N pole respectively correspond to the upper part and the lower part thereof. In such a case, the fourth magnet portions 371 and 372 corresponding to the third magnet portion 360 may be arranged so that the magnetic poles thereof properly match the magnetic poles of the third magnet portion 360.

A magnetic shield 360a is mounted on an upper surface and a lower surface of the third magnet portion 360. Since the material and function of the magnetic shield 360a are the same as those of the magnetic shield 340a, a detailed description of the magnetic shield 360a will be omitted here.

The fourth magnet portions 371 and 372 are embedded in the second receiving portion 332. The fourth magnet portions 371 and 372 may each be a permanent magnet, but the present invention is not limited to this arrangement. That is, according to an example of the present invention, the fourth magnet portions 371 and 372 may each be an electromagnet, or the like.

The fourth magnet portions 371 and 372 are embedded in the second receiving portion 332, but the present invention is not limited to this arrangement. That is, according to an example of the present invention, the fourth magnet portions 371 and 372 may be mounted on a surface of the second receiving portion 332.

Each of the fourth magnet portions 371 and 372 has a square or substantially square shape. The fourth magnet portions 371 and 372 are arranged on an upper part and a lower part of the second receiving portion 332, respectively. At this time, the third magnet portion 360 is disposed between the fourth magnet portions 371 and 372, and thus the fourth magnet portions 371 and 372 operate in conjunction with the third magnet portion 360.

The fourth magnet portions 371 and 372 are arranged so that the magnetic poles thereof may be arranged in a direction perpendicular or substantially perpendicular to the sliding direction. That is, each of the fourth magnet portions 371 and 372 is arranged so that the S pole and the N pole respectively correspond to an upper part and a lower part of each fourth magnet portion 371 and 372, as illustrated in FIG. 13.

The magnetic poles of the fourth magnet portions 371 and 372 are arranged in an order opposite to that of the magnetic poles of the third magnet portion 360. Thus, since a repulsive force acts between each of the fourth magnet portions 371 and 372, and the third magnet portion 360, a stable sliding operation can be realized.

The arrangement of the magnetic poles of the fourth magnet portions 371 and 372 may be the same as the arrangement of the magnetic poles of the second magnet portions 351 and 352 in order to compensate for the difference in length between the second magnet portion 351 and the second magnet portion 352, as described above. That is, the second magnet portion 351 formed in the first receiving portion 322 can be formed to correspond to a left end of the second sliding member 320, as illustrated in FIG. 11. On the other hand, the second magnet portion 352 formed in the second support portion 321 is formed to be shorter than the second magnet portion 351 by a predetermined length due to the second guide portion 324. However, when the length of the second magnet portion 352 is the same as that of the second magnet portion 351, a uniform magnetic force can be generated, and a sliding distance can be extended. Accordingly, the magnetic poles of the fourth magnet portion 371 are the same as those of the second magnet portion 352, and thus the fourth magnet portion 371 can functions as an extension of the second magnet portion 352.

As a result of the above structure, a sliding length, by which the third sliding member 330 slides along the second sliding member 320, can be extended. By extending the sliding length of the third sliding member 330, an available space is increased, thereby improving convenience for a user. In addition, since each of the second magnet portion 251 and the second magnet portion 252 is formed on a surface on which at least a part of each of the fourth magnet portions 371 and 372 is disposed, the sliding structure 300 can be thinner than a conventional four-directional sliding structure.

The third magnet portion 360, and the fourth magnet portions 371 and 372 are arranged so that a perpendicular or substantially perpendicular imaginary line, which connects surfaces of the fourth magnet portions 371 and 372, which face each other, passes at least a part of the third magnet portion 360 throughout the entire sliding operation. As a result of this structure, a repulsive force always acts between the third magnet portion 360 and each of the fourth magnet portions 371 and 372. Accordingly, friction is minimized when the third sliding member 330 including the fourth magnet portions 371 and 372 slides along the second sliding member 320 including the third magnet portion 360 since the third sliding member 330 is lifted from a surface of the second sliding member 320 due to a repulsive force. In such a case, the degree of lifting is proportional to the repulsive magnetic force, and more particularly, to the size and property of the magnet used.

In the present embodiment, the third magnet portion 360, and the fourth magnet portions 371 and 372 are arranged so that the perpendicular or substantially perpendicular imaginary line, which connects the surfaces of the fourth magnet portions 371 and 372, which face each other, passes at least a part of the third magnet portion 360 throughout the entire sliding operation, but the present invention is not limited to this arrangement. That is, according to an example of the present invention, the perpendicular or substantially perpendicular imaginary line may not pass through the third magnet portion 360. However, in such a case, the third magnet portion 360, and each of the fourth magnet portions 371 and 372 are arranged at a smaller distance from each other than in the previous case, so that a repulsive force generated between the third magnet portion 360 and each of the fourth magnet portions 371 and 372 may increase in order to decrease sliding friction.

Magnetic shields 373a and 373b are arranged on a lower surface of a fourth magnet portion 371 and an upper surface of a fourth magnet portion 372, respectively. Since the materials and functions of the magnetic shields 373a and 373b are the same as those of the magnetic shields 353a and 353b, a detailed description of the magnetic shields 373a and 373b will be omitted here.

In the sliding structure 300, one of the first sliding member 310, the second sliding member 320 and the third sliding member 330 is embedded in a primary body in which a main chip set of an electronic device such as a cellular phone, a camera, a PMP, a PC or the like, and an electronic portion such as a battery are integrated, and the other members of the first sliding member 310, the second sliding member 320 and the third sliding member 330 are embedded in a secondary body having a relatively simple structure. Accordingly, the sliding operation of the sliding structure 300 is performed.

That is, as illustrated in FIG. 11, the first sliding member 310 is mounted on the primary body, the second sliding member 320 is mounted on a circuit board, and the third sliding member 330 is mounted on the secondary body on which a button portion is formed. In addition, one of the first sliding member 310, the second sliding member 320 and the third sliding member 330 may be integrally formed with the primary body, and the other members of the first sliding member 310, the second sliding member 320, and the third sliding member 330 may be integrally formed with the secondary body. In such a case, the volume of the sliding structure 300 can be reduced, and thus a thin electronic device, which can smoothly perform a sliding operation, can be realized.

The sliding structure 300 includes the first sliding member 310 and the second sliding member 320, which respectively include the first guide portion 312 and the first receiving portion 322 in order to slide in one direction, and the second sliding member 320 and the third sliding member 330, which respectively include the second guide portion 324 and the second receiving portion 332 in order to slide in a direction perpendicular or substantially perpendicular to the direction in which the first sliding member 310 slides along the second sliding member 320. That is, as illustrated in FIG. 11, the first sliding member 310, the second sliding member 320 and the third sliding member 330 are configured so that the first sliding member 310 may slide along the second sliding member 320 in the direction A, and simultaneously the third sliding member 330 may slide along the second sliding member 320 in the direction B.

Accordingly, since the sliding structure 300 is extendable in horizontal and vertical directions of an electronic device including the sliding structure 300, the electronic device can have an increased available space, and can have various extension key pads mounted thereon. Since a portion of the sliding structure 300, which slides in the direction A, and a portion of the sliding structure 300, which slides in the direction B, partially overlap each other, the thickness of the sliding structure 300 can be reduced.

Figure 14:
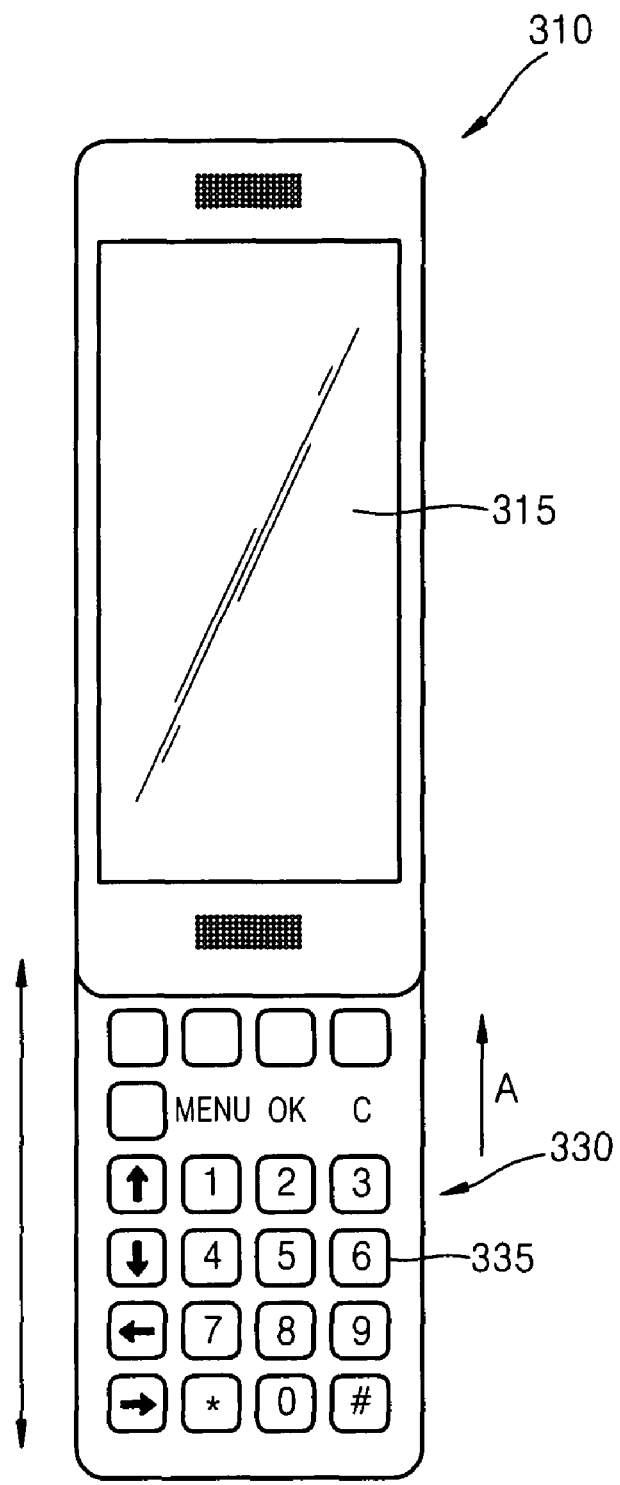
FIG. 14 is a view of the sliding structure of FIG. 11 in a case where the sliding structure slides so as to expose only a number key pad, according to an embodiment of the present invention.
Figure 15:
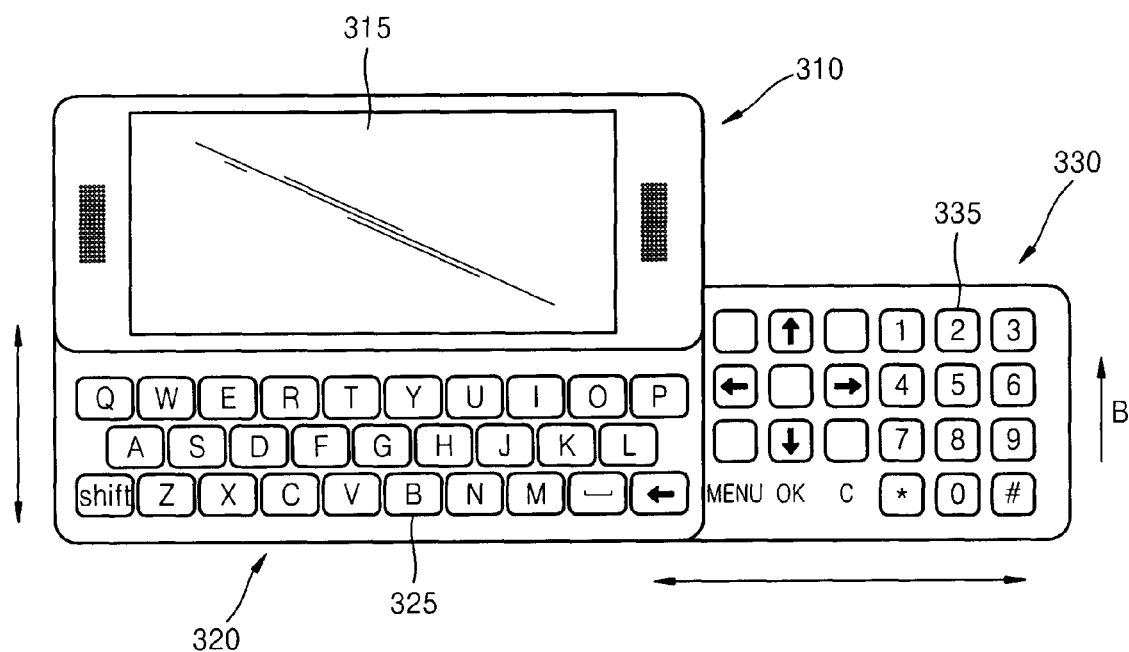
FIG. 15 is a view of the sliding structure of FIG. 11 in a case where the sliding structure slides so as to expose the number key pad and an extension key pad, according to an embodiment of the present invention.

FIG. 14 is a view of the sliding structure 300 of FIG. 11 in the case where the sliding structure 300 slides so as to expose only the number key pad 335, according to an embodiment of the present invention. FIG. 15 is a view of the sliding structure 300 of FIG. 11 in the case where the sliding structure 300 slides so as to expose the number key pad 335 and the extension key pad 325, according to an embodiment of the present invention.

Throughout this specification, a direction, in which letters or numbers displayed on the key pads 325 and 335 are displayed, is referred to as the 'readable display direction'. The readable display direction is a direction in which a user can read the key pads 325 and 335 without rotating the sliding structure 300 during use of the sliding structure 300. That is, in FIG. 14, the readable display direction of the number key pad 335 is a direction A. In addition, in FIG. 15, the readable display direction of each of the number key pad 335 and the extension key pad 325 is a direction B.

Referring to FIG. 14, when the sliding structure 300 slides to expose only the number key pad 335, the readable display direction of the number key pad 335 is the direction A. That is, when a user uses a telephone function, i.e., when only the third sliding member 330 is pulled with respect to the second sliding member 320 to be used, the readable display direction of the number key pad 325 is parallel or substantially parallel to the second receiving portion 332, like a conventional sliding structure.

Referring to FIG. 15, when the sliding structure 300 slides to expose both the number key pad 335 and the extension key pad 325, the readable display direction of each of the number key pad 335 and the extension key pad 325 is the direction B. That is, when a user uses a letter type function, i.e., when both the first sliding member 310 and the third sliding member 330 are pulled with respect to the second sliding member 320, the readable display direction of each of the number key pad 335 and the extension key pad 325 can be changed to a direction perpendicular or substantially perpendicular to the second receiving portion 332.

Generally, a key pad of an electronic device is formed by using a method in which a plurality of keys, which are formed by engraving, embossing or perforating a metal thin film or a plastic material, are disposed on a silicon pad or a contact pad having flexibility. In addition, the key pad is configured so that light emitted by a light emitting diode (LED) of a printed circuit board (PCB) disposed below the silicon pad or the contact pad may be transmitted above the silicon pad so as to highlight, for example, an ejection key. In an example of the present invention, at least one LED corresponding to respective keys is formed, and thus various number buttons and menu buttons can be displayed by one key in horizontal and vertical directions.

At least one light source such as an LED is disposed according to an arrangement of respective keys. When the number key pad 335 and the extension key pad 325 are both used, the corresponding light source operates and values of input keys of the number key pad 335 and extension key pad 325 are set so that the number key pad 335 and extension key pad 325 may be read in the same direction. Such light is emitted from a two-directional light source in respective light paths with respect to a corresponding key, and thus a user can easily notice a changed state of the number key pad 335 and the extension key pad 325 according to the respective set state.

However, the present invention is not limited to this arrangement. That is, an emissive unit such as a plurality of LEDs, ELs or the like may be formed in the number key pad 335 and the extension key pad 325. Various numbers can be displayed in a horizontal or vertical direction by at least one emissive unit corresponding to one key. Alternatively, an individual button may be mechanically rotated in a horizontal or vertical direction. In such a case, an original value of a key may be maintained, and simultaneously only the readable display direction may be rotated by using a simple rotating manner. Alternatively, the number key pad 335 may be a one touch screen, and thus the display direction of an image may be changed.

The readable display direction and the arrangement of the number key pad 335 will now be described.

First, the readable display direction of the number key pad 335 may be simply changed. For example, when only the number key pad 335 is exposed, a button "1" indicates a direction parallel or substantially parallel to the second receiving portion (see 332 of FIG. 11). When the number key pad 335 and the extension key pad 325 are both exposed, the button "1" indicates a direction perpendicular or substantially perpendicular to the second receiving portion (see 332 of FIG. 11). In such a case, the respective button always indicates the same function, and the button is changeably displayed in a horizontal or vertical direction. As a result of this structure, a user can easily notice the number key pad 335 and the extension key pad 325 according to the use of an electronic device.

The readable display direction and the arrangement of the number key pad 335 can be changed. For example, a button "6" indicating the direction parallel or substantially parallel to the second receiving portion (see 332 of FIG. 11) can be changed to a button "1" indicating the direction perpendicular or substantially perpendicular to the second receiving portion (see 332 of FIG. 11). That is, the function and display of a respective key can be changed according to whether only the number key pad 335 is exposed, or both the number key pad 335 and the extension key pad 325 are exposed. As a result of this structure, a user can easily view the number key pad 335 and the extension key pad 325 according to the use state of an electronic device. Furthermore, since the arrangement of the number key pad 335 and the extension key pad 325 of the electronic device is similar to that of a general computer, convenience for a user can be improved.

A change time, i.e., the point of time when the readable display direction and the arrangement of the number key pad 335 are changed, has to be detected in order to change the readable display direction and the arrangement of the number key pad 335. At this time, various methods can be used in order to detect the change time of the readable display direction and the arrangement of the number key pad 335.

First, it can be detected that both the first sliding member 310 and the third sliding member 330 have slid open, and thus the number key pad 335 and the extension key pad 325 are both exposed. For this, a position detection sensor, a tact switch, or an open/close detection means using a permanent magnet may be formed on at least one of the first sliding member 310, the second sliding member 320 and the third sliding member 330. When the first sliding member 310 and the third sliding member 330 are both exposed, the position detection sensor or the tact switch can detect the opened position. It assumed that, when the first sliding member 310 and the third sliding member 330 are both exposed, that, in this case, letters are generally input. Alternatively, an automatic pivot function can be used. The automatic pivot function is mainly used in a display field, and is performed by automatically adjusting an image when a monitor is pivoted. In this example of an embodiment of the present invention, the pivot function is used in the number key pad 335 and the extension key pad 325, and thus the number key pad 335 is disposed so as to be parallel or substantially parallel to the second receiving portion 332 when an electronic device is disposed in a vertical length thereof, as illustrated in FIG. 14. In addition, the number key pad 335 is disposed so as to be perpendicular or substantially perpendicular to the second receiving portion 332 when the electronic device is disposed in a horizontal direction thereof, as illustrated in FIG. 15. Such an automatic pivot function is commonly used, and thus a detailed description thereof will be omitted here.

A change to the readable display direction and the arrangement of the number key pad 335 can be manually performed. That is, if a user wants to change the readable display direction of each of the number key pad 335 and the extension key pad 325, or if the readable display direction of each of the number key pad 335 and the extension key pad 325 is already changed although the user does not want to change the readable display direction of each of the number key pad 335 and the extension key pad 325, the readable display direction and the arrangement of the number key pad 335 can be changed by using additional 'buttons for changing the readable display direction and arrangement of the number key pad 335'.

As a result of the above-described structure, when the number key pad 335 and the extension key pad 325 are both exposed, the arrangement of the number key pad 335 and the extension key pad 325 is similar to that of a general computer, and thus a user can easily input and edit letters.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A sliding structure for an electronic device, the sliding structure comprising:
   a first sliding member comprising at least one first guide portion;
   a second sliding member comprising a first receiving portion receiving the first guide portion so that the first sliding member slides, and at least one second guide portion formed on a plane that is not the same plane on which the first receiving portion is formed;
   a third sliding member comprising a second receiving portion receiving the second guide portion so that the second sliding member slides;
   a first magnet portion disposed in the first guide portion;
   a pair of second magnet portions disposed in the first receiving portion so as to face each other, wherein the first guide portion is disposed between the second magnet portions, and a repulsive force acts between each of the second magnet portions, and the first magnet portion;
   a third magnet portion disposed in the second guide portion; and
   a pair of fourth magnet portions disposed in the second receiving portion so as to face each other, wherein the second guide portion is disposed between the fourth magnet portions, and the second guide portion, and a repulsive force acts between each of the fourth magnet portions, and the third magnet portion.

2. The sliding structure of claim 1, wherein the first guide portion and the second guide portion are formed substantially perpendicular to each other.

3. The sliding structure of claim 1, wherein at least one of the second magnet portions disposed in the first receiving portion is disposed on substantially the same plane on which at least one of the fourth magnet portions disposed in the second receiving portion is disposed.

4. The sliding structure of claim 1, wherein magnetic poles of the first magnet portion and the second magnet portions are arranged substantially perpendicular to a sliding direction in which the second sliding member slides along the first sliding member.

5. The sliding structure of claim 4, wherein at least one of the magnetic poles of the pair of second magnet portions and the magnetic poles of the pair of fourth magnet portions is arranged so as to be the same as each other.

6. The sliding structure of claim 1, wherein magnetic poles of the third magnet portion and the fourth magnet portions are arranged substantially perpendicular to a sliding direction in which the third sliding member slides along the second sliding member.

7. The sliding structure of claim 6, wherein at least one of the magnetic poles of the pair of second magnet portions and the magnetic poles of the pair of fourth magnet portions is arranged so as to be the same as each other.

8. The sliding structure of claim 1, wherein at least magnetic shield is formed in the first receiving portion and the second receiving portions.

9. The sliding structure of claim 1, wherein a magnetic shield is formed on at least a part of a surface of each of the second magnet portions and the fourth magnet portions.

10. The sliding structure of claim 1, wherein the first magnet portion and the second magnet portions are disposed so that a substantially perpendicular imaginary line, which connects surfaces of the second magnet portions, which face each other, always passes through at least a part of the first magnet portion throughout an entire sliding operation of the second sliding member with respect to the first sliding member.

11. The sliding structure of claim 1, wherein the third magnet portion and the fourth magnet portions are disposed so that a substantially perpendicular imaginary line, which connects surfaces of the fourth magnet portions, which face each other, always passes through at least a part of the third magnet portion throughout an entire sliding operation of the third sliding member with respect to the second sliding members.

12. The sliding structure of claim 1, wherein the magnetic poles of the second magnet portions are arranged in a direction in which the magnetic poles of the fourth magnet portions are arranged.

13. The sliding structure of claim 1, wherein the lengths of the second magnet portions are different from each other so that a sliding length is extended, by which the second sliding member slides along the first sliding member.

14. The sliding structure of claim 13, wherein one of the fourth magnet portions has magnetic poles arranged in a direction in which the magnetic poles of the second magnet portion are arranged, and is formed on a side of one of the second magnet portions, which is shorter than the other of the second magnet portions.

15. The sliding structure of claim 1, wherein a sliding operation of the second sliding member with respect to the first sliding member is guided by a repulsive force acting between the first magnet portion and each of the second magnet portions, and by a repulsive force acting between the first magnet portion and each of the fourth magnet portions.

16. A sliding structure for an electronic device, the sliding structure comprising:
   a first sliding member comprising at least one first guide portion;
   a second sliding member comprising a first receiving portion receiving the first guide portion, and at least one second guide portion formed on a part that is not a surface on which the first receiving portion is formed;
   a third sliding member comprising a second receiving portion receiving the second guide portion;
   a first key pad portion formed on the second sliding member; and
   a second key pad portion formed on the third sliding member,
   wherein at least one of the first key pad and the second key pad is formed so that a display form thereof is changeable.

17. The sliding structure of claim 16, wherein a readable display direction of at least one of the first key pad portion and the second key pad portion is changeable.

18. The sliding structure of claim 16, wherein an arrangement of at least one of the first key pad portion and the second key pad portion is changeable.

19. The sliding structure of claim 16, wherein readable display directions of the first key pad portion and the second key pad portion are substantially the same when the first key pad portion and the second key pad portion are both exposed.

20. The sliding structure of claim 16, further comprising:
   a sensor or a switcher, which detects an open or close state of at least one of the first sliding member, the second sliding member and the third sliding member, is formed on at least one of the first sliding member, the second sliding member and the third sliding member.

21. The sliding structure of claim 16, further comprising:
   a user interface member by which a readable display direction of at least one of the first key pad and the second key pad is changeable.

22. The sliding structure of claim 16, wherein a readable display direction of the second key pad is substantially parallel to the second receiving portion when only the third sliding member is exposed.

23. The sliding structure of claim 16, wherein a readable display direction of the second key pad is substantially perpendicular to the second receiving portion when the first sliding member and the third sliding member are both exposed.

24. The sliding structure of claim 16, wherein an arrangement of the second key pad is constant both when a readable display direction of the second key pad portion is substantially perpendicular to the second receiving portion, and when the readable display direction of the second key pad portion is substantially parallel to the second receiving portion.

* * * * *